US009495646B2

(12) United States Patent
Beigi et al.

(10) Patent No.: US 9,495,646 B2
(45) Date of Patent: Nov. 15, 2016

(54) MONITORING HEALTH OF DYNAMIC SYSTEM USING SPEAKER RECOGNITION TECHNIQUES

(71) Applicants: Homayoon Beigi, Yorktown Heights, NY (US); Raimondo Betti, Tenafly, NJ (US); Luciana Balsamo, New York, NY (US)

(72) Inventors: Homayoon Beigi, Yorktown Heights, NY (US); Raimondo Betti, Tenafly, NJ (US); Luciana Balsamo, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 347 days.

(21) Appl. No.: 14/297,595

(22) Filed: Jun. 5, 2014

(65) Prior Publication Data
US 2014/0365411 A1 Dec. 11, 2014

Related U.S. Application Data

(60) Provisional application No. 61/831,601, filed on Jun. 5, 2013.

(51) Int. Cl.
| G06N 99/00 | (2010.01) |
| G01M 13/02 | (2006.01) |
| G10L 17/26 | (2013.01) |

(52) U.S. Cl.
CPC .......... *G06N 99/005* (2013.01); *G01M 13/028* (2013.01); *G10L 17/26* (2013.01)

(58) Field of Classification Search
None
See application file for complete search history.

(56) References Cited

U.S. PATENT DOCUMENTS

| 5,255,565 | A | * | 10/1993 | Judd | G01H 1/00 248/550 |
| 6,006,163 | A | * | 12/1999 | Lichtenwalner | G01H 5/00 702/34 |
| 9,316,617 | B2 | * | 4/2016 | Graebner | G01N 27/90 |
| 2008/0255777 | A1 | * | 10/2008 | Beard | G01N 29/041 702/35 |
| 2013/0130734 | A1 | * | 5/2013 | Rice | G01M 5/0066 455/517 |
| 2013/0204592 | A1 | * | 8/2013 | Dixit | G01M 5/0025 703/2 |

OTHER PUBLICATIONS

Chakraborty et al, Structural Damage Detection with Insufficient Data using Transfer Learning Techniques, 2011.*
Prabhu et al, Feature Assimilation for Vibration Based Damage Detection, 2013.*
E. Figueiredo et al., "Structural Health Monitoring algorithm comparisons using standard data sets", "Los Alamos National Laboratory Report", 2009, pp. 1-115, vol. LA-14393, Publisher: U.S. Department of Energy, Published in: http://library.lanl.gov/cgi-bin/getfile?LA-14393.pdf.
E. Figueiredo et al., "Machine learning algorithms for damage detection under operational and environmental variability", "Structural Health Monitoring", 2011, pp. 559-572, vol. 10, No. 6, Publisher: Sage Publications, Published in: http://shm.sagepub.com/content/10/6/559.full.pdf+html.

* cited by examiner

*Primary Examiner* — Stanley K Hill
*Assistant Examiner* — Mikayla Chubb
(74) *Attorney, Agent, or Firm* — Eugene J. Molinelli; Beusse Wolter Sanks & Maire, PLLC

(57) ABSTRACT

Monitoring health of dynamic systems includes using speaker recognition techniques. Some embodiments include determining a system-independent statistical (first) model, and determining a healthy system (second) model based on data representing vibrations of multiple healthy systems and the first model and speaker recognition techniques. Vibration data are obtained from a particular system. It is determined whether the particular system is unhealthy based on the vibration data from the particular system and the first model and the second model and speaker recognition techniques. Some embodiments include obtaining training data that represents vibrations of multiple healthy systems. A damage-sensitive parameter is based on the training data. A threshold value that separates damaged systems from healthy systems is based on the training data and the parameter. It is determined whether a particular system is healthy based on the threshold value and a value for the parameter for vibration data from the particular system.

20 Claims, 15 Drawing Sheets

MONITORING HEALTH OF DYNAMIC SYSTEM USING SPEAKER RECOGNITION TECHNIQUES

BACKGROUND OF THE INVENTION

Most legacy techniques in health monitoring of structures use models of the structures which are quite structure dependent and expensive to generate. Also, these models could be imprecise and far from the true nature of the structure, especially when the structure has a complex architecture.

SUMMARY OF THE INVENTION

Applicants have determined that a passive technique that, in some embodiments, simply monitors the vibration signal of a structure or other dynamic system, and learns its nominal vibration, is much preferred to physical models of the structure being monitored. Furthermore, Applicants have determined that vibration data from a structure can be used to distinguish degree of damage to the structure by processing with speaker recognition techniques. As used herein, a dynamic system refers to any item that is able to propagate vibrations, and includes architectural structures such as buildings and bridges, vibrating machinery, geological features, and other objects. A dynamic system is considered healthy if suitable for its intended purpose for an extended period of time and considered unhealthy if damaged or approaching a state of failure for its intended purpose.

In a first set of embodiments, a method for monitoring health of a dynamic system includes determining a system-independent statistical model, and determining a healthy system model based on data representing vibrations of multiple healthy bodies and the system-independent statistical model and speaker recognition techniques. Vibration data are obtained from a particular dynamic system. The method includes determining whether the particular dynamic system is healthy based on the vibration data from the particular dynamic system and the system-independent statistical model and the healthy system model and speaker recognition technique.

In a second set of embodiments, a method includes obtaining training data that represents vibrations of a healthy dynamic system under multiple conditions. A damage-sensitive parameter is based on the training data by warping a frequency scale of the training data. A threshold value that separates damaged systems from healthy systems is based on the training data and the damage-sensitive parameter. It is determined whether a particular system is healthy based on the threshold value and a value for the damage-sensitive parameter for vibration data from the particular system.

In other sets of embodiments, an apparatus performs, or a computer-readable medium causes an apparatus to perform, one or more steps of one or more of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
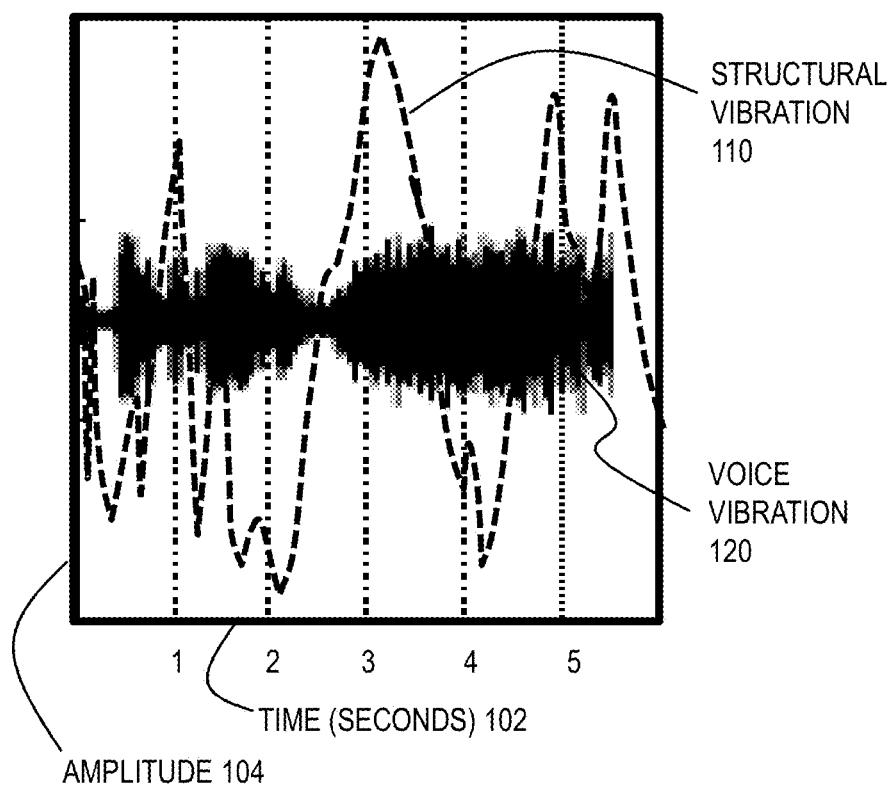
FIG. 1 is a diagram that illustrates example voice and structural vibrations, according to an embodiment.

A method and apparatus are described for monitoring health of dynamic systems using speaker recognition techniques. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of buildings and bridges as structures. However, the invention is not limited to this context. In other embodiments the techniques are applied to other dynamic systems, including architectural structures for human occupation or not, such as bridges, and vibrating machinery, manufactured devices, geologic formations and woody parts of living or deceased organisms.

To assess the health and integrity of structures such as bridges and buildings, some training data is available from the structure of interest at its healthy state. The data is expected to be in the form of a signal in time which may be provided by sensors such as strain gauges and accelerometers. Applicants have determined that the signal, being a vibration signal, can be processed as speech signals to identify and verify identities of individuals. It has been determined that the techniques for handling speech may be used in order to learn the healthy states of structures. Once the data for the healthy states has been modeled, using speaker modeling techniques, deviations from these healthy states are identified using the techniques of speaker verification. As used herein, speaker recognition techniques include techniques of speaker modeling and speaker verification.

In using speaker and speech recognition techniques in health monitoring of structures, a large training data is advantageous to be able to create a generic model of the structural dynamics. Since these techniques are statistical in nature, a large amount of data improves accuracy for the estimation of the many statistical parameters that make up the models. However, only a small amount of data is extracted usually from structures such as bridges and buildings compared to the amount of data used for speaker recognition. One reason for this is that such structures possess very low fundamental and higher harmonic frequencies compared to speech. Another reason is that there are far fewer such structures than people. Therefore, the number of data samples collected over time is small compared to speech. In contrast, providers of speech recognition systems (such as RECOGNITION TECHNOLOGIES, INC.™ of Yorktown Heights, N.Y.) possess speech data from on an order of millions of speakers. It is quite impractical to have structural vibration data from on an order of millions of structures.

Furthermore, structure vibration data is collected at a sampling rate of about 100 Hertz (Hz, 1 Hertz=1 sample per second). In contrast, the speech data is sampled at a much higher sampling rate, such as 8 kiloHertz (kHz, 1 kHz=$10^3$ Hertz), providing many more samples.

FIG. 1 is a diagram that illustrates example voice and structural vibrations, according to an embodiment. The diagram takes the form of a hypothetical plot with a horizontal axis 102 representing time in seconds and a vertical axis 104 representing amplitude in arbitrary units. Trace 110 represents hypothetical structural vibrations that have relatively large amplitude but low frequencies and harmonics, well sampled at a sampling rate of 20 Hz. Trace 120 represents hypothetical voice vibrations that have relatively smaller amplitude but much higher frequencies and harmonics, involving a sampling rate of over 8 kHz.

Applicants have determined that at least one approach to speaker recognition achieves some efficiencies that allow those techniques to be used with the limited amount of structural vibration data. These techniques are mentioned in Appendix A and described by Homayoon Beigi, *Fundamentals of Speaker Recognition*, Springer, New York, 2011, ISBN: 978-0-387-77591 (hereinafter Beigi), the entire contents of which are hereby incorporated by reference as if fully set forth herein. The speech data processing of Beigi is used for creating structure-independent statistical models and other system-independent statistical models.

The statistical techniques used in speaker recognition (see Beigi) develop a speaker-independent statistical model which is the basis for modeling speaker dependent traits. Much in the same way, a structure-independent statistical model is developed for structures, or, more generally a system-independent statistical model is developed for dynamic systems. Since speech and dynamic system vibration are both natural vibrations, in some embodiments the speaker-independent data already available from speaker recognition systems is used as a system-independent statistical model, e.g., a structure-independent statistical model in the following embodiments. Thus, in some embodiments, the speaker-independent statistical model is used to generate the system-independent statistical model. In some embodiments, the speech or dynamic system vibration data undergoes one or more transformations in the frequency or time or feature domain to account for the basic differences in the systems producing the vibration, e.g., human voice box versus wind and machinery. For example, the structural vibration trace 110 is normalized in amplitude and compressed in time (e.g., by a factor of 100/8000≈0.0125) to be more similar to the voice vibration trace 120 so that existing speaker recognition systems can be used intact. In another example embodiment, the speaker-independent statistical model is transformed in frequency or amplitude or cepstral components, or some combination, to be comparable to the structure vibration data.

The approach presented herein is a passive technique that simply monitors the vibration signal of the dynamic system and learns its nominal vibration. This is preferred to the previous techniques of modeling the dynamic system and predicting its vibrational modes. This new approach is derived from the techniques that are used for modeling the identity of a speaker in speaker recognition. The speaker recognition techniques evolved due to the fact that it is very hard to model the vocal tract of a speaker with sufficiently good precision. One of the most popular features being used in speaker recognition is the set of Mel-cepstral coefficients derived from modeling echoes. There are also many other features such as amplitude modulation (AM)/frequency modulation (FM) modulation features, wavelet octave coefficients of residues (WOCORs), etc., all described in Beigi. These and other related features are utilized in various embodiments in order to model the structures of interest.

Figure 2:
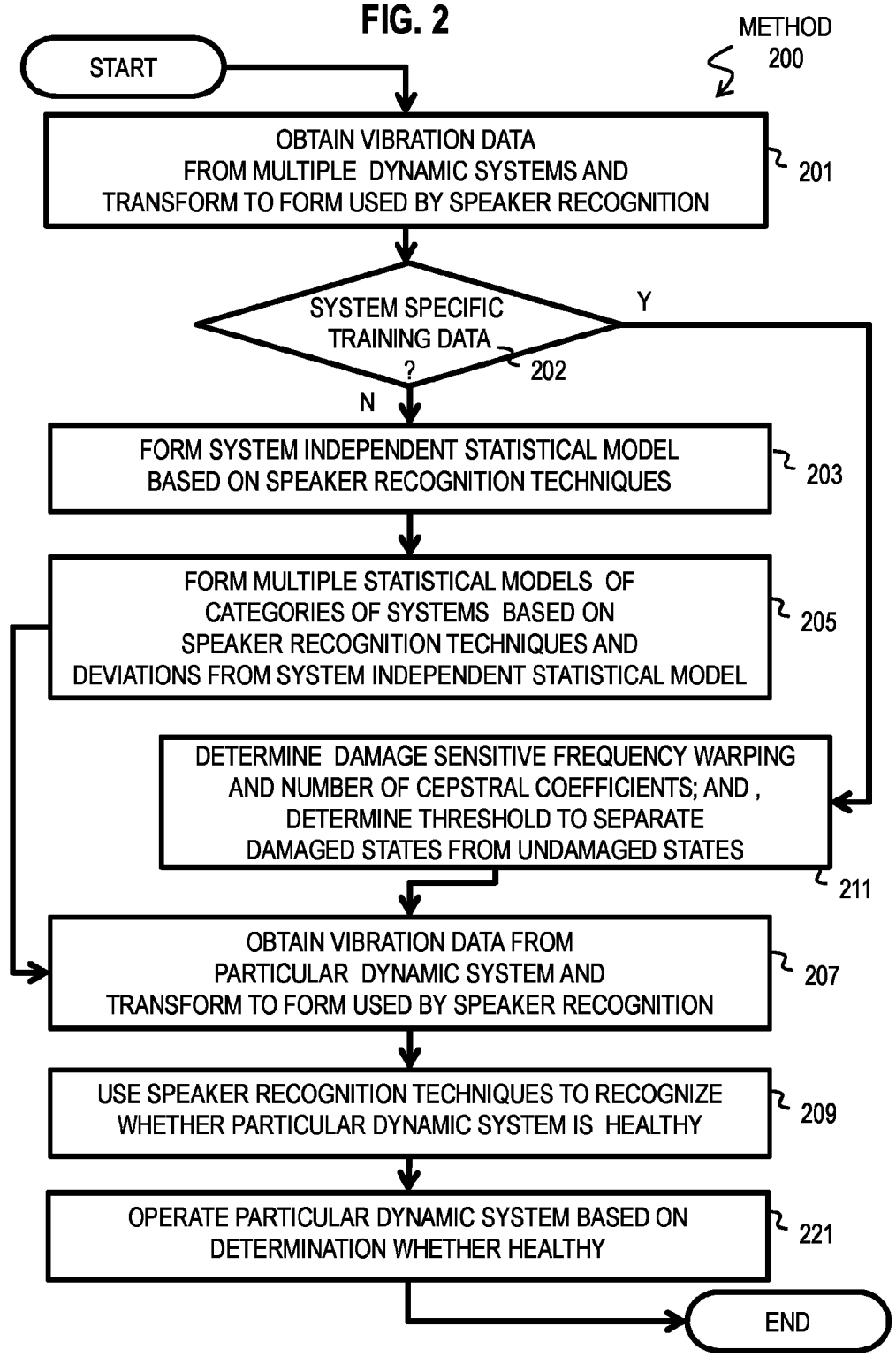
FIG. 2 is a flow diagram that illustrates an example method to determine damaged structures, according to an embodiment.

FIG. 2 is a flow diagram that illustrates an example method to determine damaged structures, according to an embodiment. Although steps are depicted in FIG. 2, and following flow diagrams in FIG. 6A and FIG. 7A through FIG. 7C, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 201, vibration data from one or more dynamic systems are obtained and transformed as desired for use with a speaker recognition system. For example, vibration data collected routinely at bridges and other structures over the past 15 years are obtained as data files, on one or more computer readable media or transmitted from a remote computer or server or database, or entered manually, or scanned and digitized from hardcopies, or some combination. In some embodiments, measurements are collected directly from sensors mounted on one or more structures. In some embodiments, the transformation is omitted. In some embodiments, the transformation includes compressing the time axis so that the variations fall in the frequency band of human voices, or normalized in amplitude so that maximum amplitude is 1.0, or some combination. In some embodiments, other transformations are performed on the data. For example, the amplitudes are normalized for a mean of 0.0 and a standard deviation of 1.0. In some embodiments, the cepstrum is taken, which is the Fourier transform of the logarithm of the frequency spectrum of the vibrations. In some embodiments, these transformation are performed in some combination.

In step 202 it is determined whether there is sufficient training data for a specific system. If so, control passes to step 211, described below. If not, control passes to step 203.

In step 203, a system-independent statistical model is determined based on speaker recognition techniques. For example, in some embodiments, the vibrational data obtained in step 201 is processed to characterize the features of structural vibration that are found in every structure or every structure of one type (e.g., different types including bridges or steel skeleton high rises, or stone walls, among others). In some embodiments, the structure-independent statistical model is based on the transformed or untransformed speaker-independent statistical model of voices from a speaker recognition system (e.g., from RECOGNITION TECHNOLOGIES, INC.™), and step 201 is omitted. In other embodiments, some combination is used.

In step 205, a catalog of the distinctive vibrational features of certain groups of dynamic systems, such as healthy bridges or slightly damaged bridges or heavily damaged bridges, are learned, e.g., by cluster analysis, based on vibrational data from those dynamic systems and deviations from the system-independent statistical model. The techniques of speaker recognition that determine the dynamic systems are transformed for use with existing speaker recognition systems. For example, the time is compressed so that variations fall in the frequency band of human voices, and the amplitudes are transformed using any method, such as one or more of those described above. For example, in some embodiments the vibration data from one or more recently inspected suspension bridges are used to generate a healthy system model based on features that distinguish them from the well sampled speaker-independent statistical model. Any features may be used for the healthy system model, such as the percent occurrence of each cluster of a number C of clusters defined for the transformed speaker-independent statistical model, or deviations from the percent occurrence of those clusters in the speaker-independent statistical model.

In step 207, vibrational data from a particular dynamic system is obtained. For example vibration data from a particular bridge or building is obtained. Any method may be used to obtain this data, as described above. In some embodiments, the vibrational data from that dynamic system is transformed for use with existing speaker recognition systems. For example, the time is compressed so that variations fall in the frequency band of human voices, and the amplitudes are transformed using any method, such as one or more of those described above.

In step 209, it is determined whether the particular dynamic system is healthy or not based on the vibration data from the particular dynamic system and speaker recognition techniques, such as the Mel cestrum coefficients described below or the system-independent statistical model. For example, deviations from a structure-independent statistical model are used to define features of the particular structure and then deviations of those features from the closest features belonging to one of the groups of structures learned in step 205 are determined. Based on deviations from the healthy system model, the particular dynamic system (e.g., a particular bridge or particular generator) is determined to be healthy or suffering some degree of damage. For example if the deviations from several features are large enough compared to the standard deviations for the healthy system model, the particular system may be deemed damaged or tending toward unsuitability. If features of unhealthy or unsuitable categories have been defined in step 205 in some embodiments, then the particular dynamic system is grouped in that unhealthy or unsuitable category if its features are close to those of that category. Thus health can be assessed compared to the features of a healthy category or the features of an unhealthy category, or both.

In step 221, the dynamic system is operated in response to the determination whether the dynamic system is healthy or not. For example, if well within the healthy conditions, the dynamic system is operated normally with no changes. If conditions have moved toward a damaged state or are close to the damaged state threshold, then, in some embodiments, additional monitoring is performed, either by collecting vibration data more often, or for longer durations, or at different or more locations on the structures of the dynamic system, or some combination. In some embodiments, other operations are modified. For example, the dynamic system is operated less frequently or for shorter times or maintenance is performed more frequently, or the system is taken apart and reassembled with one or more replacement parts. If conditions have exceeded the damaged state threshold, then, in some embodiments, the system is subjected to diagnosis for failure, or taken apart and reassembled with one or more replacement parts, or retired from operation, or some combination.

In some embodiments, if it is determined in step 202 that there is sufficient training data, then control passes to step 211 and then step 207 described above. In step 211, a damage sensitive parameter based on frequency warping and number of cepstral coefficients is determined; and, a threshold is determined to separate damaged from undamaged states of the dynamic system, all based on training data for one or more healthy systems. In step 209, it is determined whether the dynamic system is healthy or not based on the damage sensitive parameter and the threshold.

Example Embodiments

Speaker Independent Voice Model

According to an example embodiment, to demonstrate feasibility, step 205 is performed with simulated data rather than with actual vibration data. In this embodiment, step 201 is omitted and step 205 is performed by retrieving the speaker-independent statistical model of human voice from RECOGNITION TECHNOLOGIES, INC.

Figure 3:
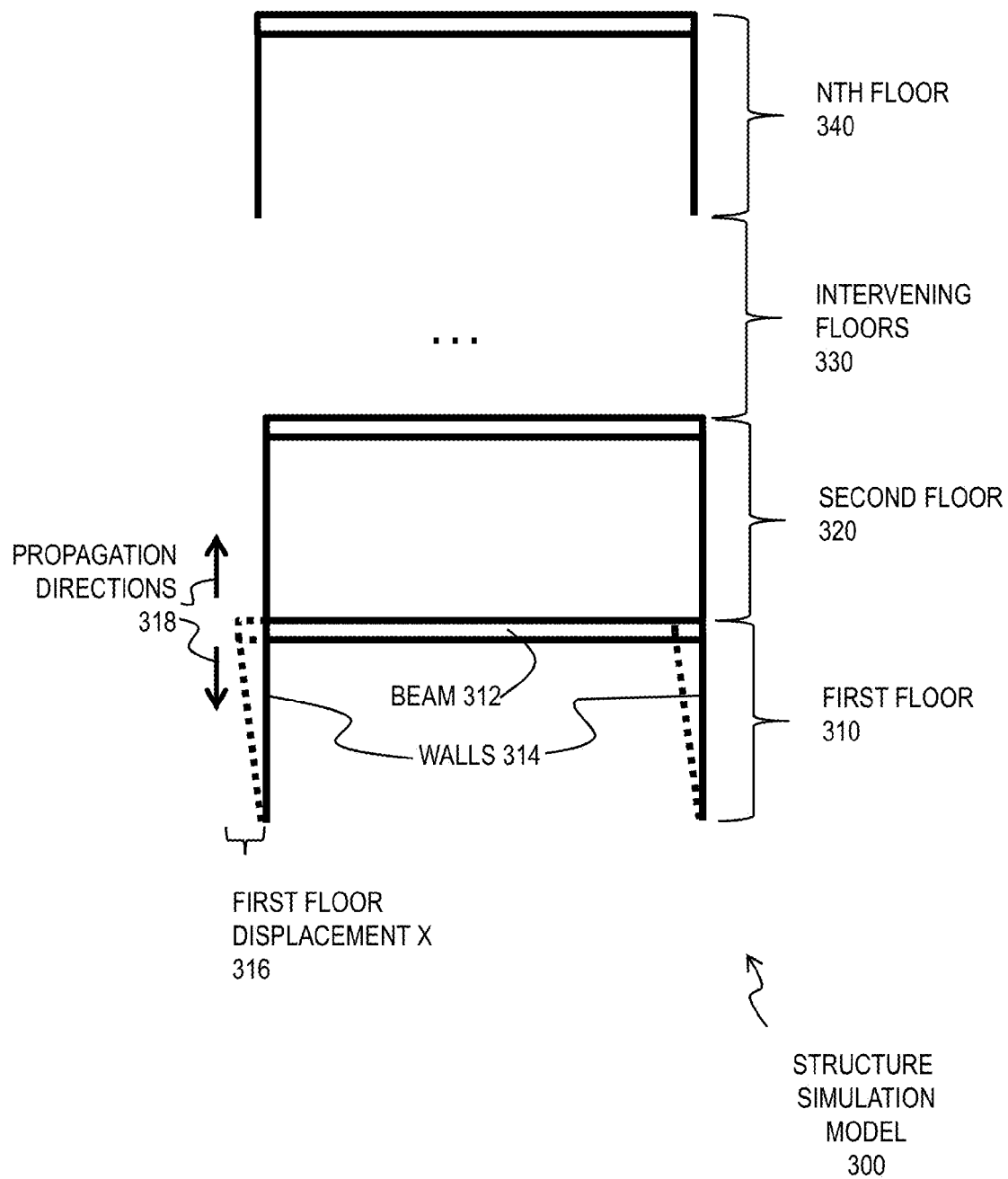
FIG. 3 is a diagram that illustrates example structural models for simulations to test the method of FIG. 2, according to an embodiment.

Vibrational data is simulated for a structure with N degrees of freedom, such as a building with N floors. FIG. 3 is a diagram that illustrates example structural models for simulations to test the method of FIG. 2, according to an embodiment. Each floor is represented by a horizontal beam, such as beam 312 and two or more supporting walls, such as walls 314. A building comprises one or more floors, such as first floor 310 with beam 312 and walls 314, a second floor 320, any intervening floors 330 represented by ellipsis, and a last, Nth, floor 340. A shear displacement of value x is represented by a horizontal displacement, such as first floor displacement x 316. A vibrational wave propagates perpendicular to the displacement, e.g., in propagation directions 318. The vibration measured at a location on the building is the sum of the propagating vibrations that reach that point, assuming displacements are in the elastic range, e.g., not so great as to rupture the building materials.

For such a structure with N degrees of freedom, the equations of motion are given by Equation 1.

$$[M]\{x''\}+[L]\{x'\}+\alpha\beta[K]\{x\}=\alpha\{f\} \quad (1)$$

where x is the nodal displacement vector of N elements (i.e., $\in R^{N-1}$);

x' is the nodal velocity vector of N elements (i.e., $\in R^{N-1}$);

x" is the nodal acceleration vector of N elements (i.e., $\in R^{N-1}$);

[K] is the stiffness matrix of N×N elements (i.e., $\in R^{N-N}$);

[L] is the damping matrix of N×N elements (i.e., $\in R^{N-N}$);

[M] is the mass matrix of N×N elements (i.e., $\in R^{N-N}$);

α is a coefficient that takes into account the system frequency content magnitude;

β is a coefficient that takes into account the damage severity; and f is a vector of nodal forcing functions of N elements (i.e., $\in R^{N-1}$).

Four different structures have been considered, represented by 1, 3, 5, and 7 degrees of freedom (DOFs) shear-type systems. Two dramatically different values were considered for α, namely 1 and 5000, to test the performance of the recognition system when dealing with signals with a frequency content typical both of civil engineering structures (α=1, designated "S1") and of speech (α=5000, designated "S2"). To β have been assigned the values 1 (healthy state, designated "H"), 0.5 (damage scenario 1, designated "D1") and 0.1 (damage scenario 2, designated "D2"). Then, for a given number of degrees of freedom, six different scenarios have been simulated as listed in Table 1.

TABLE 1

Simulation scenarios.

| identifier | α | β |
|---|---|---|
| S1, H | 1 | 1.0 |
| S1, D1 | 1 | 0.5 |
| S1, D2 | 1 | 0.1 |
| S2, H | 5000 | 1.0 |
| S2, D1 | 5000 | 0.5 |
| S2, D2 | 5000 | 0.1 |

For each one of the 6 possible states, each system was excited by a white noise input applied at each degree of freedom and the corresponding acceleration response time histories were collected for the identification tests. No measurement noise was simulated. The accelerograms were fed to the speaker recognition system of RECOGNITION TECHNOLOGIES, INC.™ and subjected to front-head processing consisting of pre-emphasis and high-pass filtering. The enrollment into categories of structures for step 205 was performed through 1 minute long time histories sampled at 8 kHz; while for the testing, in step 207, 30 seconds long records sampled at 8 kHz were employed.

The results are listed in Table 2. In Table 2, the first column indicates the label for the considered experiment and number of degrees of freedom of the simulated structure (all six scenarios were run for each); the second column indicates from which degree of freedom the acceleration time history used for the test has been recorded; the third column indicates whether mean-cepstral subtraction has been performed; finally, the fourth column represents the level of accuracy reached in the experiment.

TABLE 2

Simulation results.

| Experiment | Location of vibration time history | Mean ceptstral subtraction | Accuracy (Correctly recognized/total) |
|---|---|---|---|
| 1: N = 1 | 1$^{st}$ floor | Yes | 6/6 |
| 2: N = 3 | 1$^{st}$ floor | Yes | 6/6 |
| 3: N = 5 | 1$^{st}$ floor | Yes | 6/6 |
| 4: N = 7 | 1$^{st}$ floor | Yes | 5/6 |
| " | 2nd floor | Yes | 5/6 |
| " | 3rd floor | Yes | 6/6 |
| " | 4th floor | Yes | 3/6 |
| " | 5th floor | Yes | 5/6 |
| " | 6th floor | Yes | 4/6 |
| " | 7th floor | Yes | 6/6 |
| 5: N = 7 | 1$^{st}$ floor | No | 6/6 |
| " | 2nd floor | No | 6/6 |
| " | 3rd floor | No | 6/6 |
| " | 4th floor | No | 6/6 |
| " | 5th floor | No | 6/6 |
| " | 6th floor | No | 6/6 |
| " | 7th floor | No | 6/6 |

At the time of the enrollment, for each kind of structure, 6 possible states are trained. At the time of testing, the task of the recognition system is that of matching correctly the enrolled state with the tested one. For example, during Experiment 2, where the acceleration time history recorded from the 1st floor has been employed, all the 6 states have been identified correctly. In contrast, during the fourth experiment, when using the 4th floor time history, only 3 out of 6 states have been identified correctly. In this regard, it is worth noting that avoiding the subtraction of the mean cepstral value yields 100% accuracy for the 7 DOFs system, as shown in experiment 5.

Results of these simulations show that different conditions of multi-story buildings may be distinguished with great accuracy. Also, it has been shown that real bridge conditions may be identified by using the vibration signal to adapt a speaker-independent model into a structure dependent model This demonstrates the feasibility of the method, even for using human voices for the structure-independent statistical model.

System Specific Training Data

In another example set of embodiments, the frequency spectrum is warped and the number of cepstral coefficients representing the spectrum are modified from those items used in standard speaker recognition. In some embodiments, the modifications are manual and in some embodiments the modifications are done dynamically based on any available training set or sets.

In standard speaker recognition approaches, a melody frequency model is imposed on cepstral coefficients and termed Mel-Frequency Cepstral Coefficients (MFCC), and used as features of the voice data. Such MFCC have also been used for an active test of a bridge deck in G. Zhang, R. S. Harichandran, P. Ramuhalli, "Application of noise cancelling and damage detection algorithms in NDE of concrete bridge decks using impact signals," *Journal of Nondestructive Evaluation* v30 (4) pp 259-272, 2011 (hereinafter Zhang). Zhang used MFCCs to detect concrete delamination on a bridge deck by analyzing the MFCCs extracted from acoustic records of the impact sound produced by impacting the surface of the concrete slab with a steel bar. Sub-acoustic vibration data was not analyzed.

In the approach described in this set of embodiments, vibration data below acoustic frequencies is used; the frequency warping is modified and the number of coefficients retained are modified from standard speaker recognition methods; and, in addition, a damage threshold is determined automatically, all based on passive training data for a particular system in a healthy state.

Figure 4A:
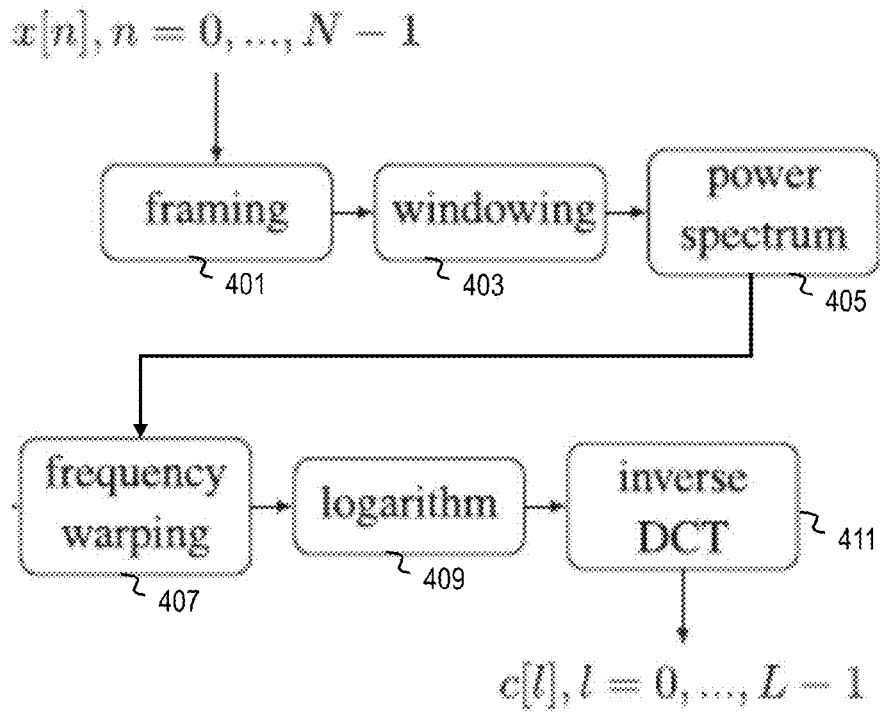
FIG. 4A is a flow diagram that illustrates a method to compute the cepstral coefficients for voice data.

To understand the differences from elements of standard speaker recognition methods, those standard elements are described next. FIG. 4A is a flow diagram that illustrates a method to compute the cepstral coefficients for voice data. The procedure to extract the Mel-Frequency Cepstral Coefficients from a sampled signal x[n] of N data points is outlined {n=0, . . . , N−1). The first operation, in step 401, segments of the training data signal into frames of length K, where K<<N. The frames are short enough to be considered stationary. Subsequently, in step 403, non-rectangular windows are applied to each frame in order to reduce riddle effects at the onset and offset of the frame spectra. Typically, the Hamming window is used for this purpose. Equation 2 shows the expression for w[k], the kth coefficient of a K-point Hamming window, $$w[k] = 0.54 - 0.46 \cos\left(\frac{2\pi k}{K}\right) \text{ for } k = 0, \ldots, K-1 \tag{2}$$

where K is the number of data points in each frame.

Once the power spectrum of each frame is evaluated, by the use of Discrete Fourier Transform (DFT) in step 405, an operation known as frequency warping is performed in step 407 to emphasize the properties of the signal in the Melody-frequency (Mel-Frequency) scale (Mel-scale). The Mel-scale is apt to represent sound pitch as perceived by the human ear. The relation between transformed Mel-Frequency, $f_{Mel}$, and linear frequency, f, is given by Equation 3.

$$f_{Mel} = 1000 \log_2\left(1 + \frac{f}{1000}\right) \tag{3}$$

The Mel and the linear frequency scales are almost equivalent up to 1000 Hz, after which their relation becomes logarithmic.

Figure 4B:
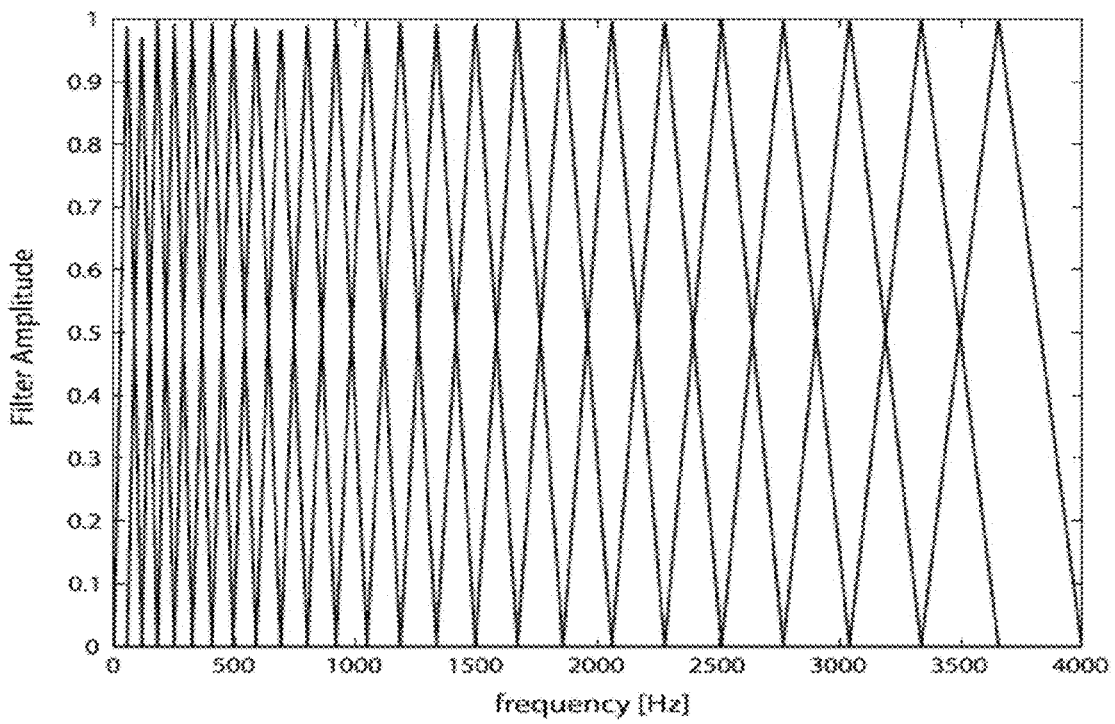
FIG. 4B is a graph that indicates triangular filters spaced equally in a warped frequency scale for speaker recognition.

Frequency warping is achieved by grouping together the DFT spectral values into M critical bands and weighting each band by a triangular weighting function. The triangular filters are constructed such that their centers are equally spaced within the Mel-scale, each filter being symmetric with respect to its center on the linear frequency scale. FIG. 4B is a graph that indicates triangular filters spaced equally in a warped frequency scale for speaker recognition. The horizontal axis indicates linear frequency in Hz, spanning the acoustic range; and, the vertical axis indicates filter amplitude relative to the peak value, dimensionless. The M bands, uniform in width and spacing on the $f_{Mel}$ scale, increase width and spacing with frequency on the linear frequency scale.

In step 409, the logarithm, base 2, of the amplitudes in each of the M bands is taken. Finally, in step 411, an L-points inverse Discrete Cosine Transform (DCT) is applied to the logarithm of the Mel spectra to complete the standard speaker features extraction procedure, yielding the cepstral coefficients c(l), l=0, . . . , L−1, as given in Equation 4. The number of cepstral coefficients can be different from that of the warped spectrum points. For example, in speaker recognition, a popular value of M is 24, while that for L is 13.

$$c[l] = \sum_{m=0}^{M-1} a_m \ln(H_{Mel}[m]) \cos\left[\frac{\pi(2l+1)m}{2M}\right] \tag{4}$$

for $l = 0, \ldots, L-1$ where $a_m$ is equal to 1/M, for m=0, and to 2/M otherwise. In Equation 4, $H_{Mel}[m]$ represents the mth point of the Mel-spectrum, where m=0; . . . , M−1, while c[l] is the lth element of the feature vector $c \in R^{L \times 1}$.

Often, the first MFCC is discarded, as it has been proved to be very sensitive to constant (direct current, DC) component effects. Furthermore, when the system is excited by random noise, input effects concentrate in the first part of the cepstrum representation of the signal. Therefore, discarding the first coefficient from the MFCC feature vector serves to reduce the effect of the input, especially when this is due to ambient acoustic noise.

In the field of speaker recognition, the values assigned to the frequency warp (at 1000 Hz), number of bands M, and the number of coefficients L are standardized; so that a user can employ such values without any kind of parametric analysis. This is a very important characteristic of the approach for speaker recognition, as it reduces the factors of subjectivity in the extraction process. The features extracted from the same signal by two different users will take on the same values, leading to the same recognition results.

There are aspects of the standard MSCC features that are useful for sub-acoustic vibration data. The framing and windowing operations are particularly appealing when dealing with non-stationary signals, as the case for a variety of structural response time histories. Indeed, when the monitored system is excited through a highly non-stationary input, as for instance in the case of storm or earthquake excitations, the response manifests non-stationarity characteristics in its transient part, the part that is often the only time history recorded for short-term structural health monitoring (SHM) applications.

Another interesting operation is represented by the use of inverse discrete cosine transform (DCT) in place of inverse Discrete Fourier Transform (DFT). DCT was shown to perform better than DFT in transforming the original data into more compact and almost uncorrelated representations, and was proved to compare closely to the Karhunen-Loève Transform (KLT), which is optimal for compressing data dimensionality. KLT is the most basic approach to perform Principal Component Analysis (PCA), which is concerned with transforming the original data by projecting them into a reduced dimension space, whose basis vectors are represented by the data covariance eigenvectors associated with the largest eigenvalues, which, in turn, represent data components characterized by the greatest variance and are the most useful for recognition purposes. However, despite being optimum, there is no efficient algorithm able to implement KLT. In contrast, DCT may be implemented exploiting Fast Fourier Transform (FFT), in a highly computationally efficient fashion.

Therefore, evaluating the DCT of a data sequence, e.g., In ($H_{Mel}[m]$) in Equation 4, above, is equivalent to giving a representation of the energy content of the signal. Thus cepstral coefficients characterized by low values are associated with low energy content and may be discarded without significant loss of information. This discussion also shows how Mel-Frequency Cepstral Coefficients may actually be interpreted as warped frame spectra compacted into a space conveying all necessary energy information regarding the original data. Moreover, it also provides the necessary background to understand the criterion employed in this work to select the number L of coefficients to use, in order to solve the damage detection problem.

The only operation of the standard MFCC computation that is questionable when applied to non-speech signals is the warping of the linear frequency scale into Mel-scale based on a 1000 Hz inflection point. Indeed, Melody scale was specifically coined to mimic the human perception of sound that is a natural phenomenon not easily relatable to structural response processes. Moreover, the bands and filter settings used in speaker recognition are standardized for signals sampled at 8-16 kilo Hertz (kHz, 1 kHz=$10^3$ Hz), which is used for much higher frequency rates than those typically employed to record the structural response.

Nonetheless, some critical frequency bands can be also identified for signals typical of structural engineering applications. Thus, in various embodiments, different frequency warping approaches are effected. For example, in some embodiments, multiple frequency warping scales are tried and selection is based on some performance criterion. Four example frequency transformations tried for vibration are given by Equations 5a through 5d, $$f_1 = (fs/8)\log_2\left(1 + \frac{8f}{fs}\right) \quad (5a)$$

$$f_2 = (fs/4)\log_2\left(1 + \frac{4f}{fs}\right) \quad (5b)$$

$$f_3 = \log_2(1 + f) \quad (5c)$$

$$f_4 = f \quad (5d)$$

where fs is the sampling frequency, e.g., about 10 to 20 Hz for many structural vibration data sets. For each of these frequency transformations, M bands were filtered with the triangular filters in the transformed frequency space. The value of M is as suggested in the literature and given by Equation 6, $$M = 3 \ln(fs) \quad (6)$$

where ln is the natural logarithm. The selected frequency transformation was based on performance criteria, as described next.

To give examples of the performance criteria, for illustrative purposes, assume that the monitored system is instrumented with s sensors, and that n realizations of the response of the system, under different healthy conditions, are measured from the available sensors. It is preferable that the n realizations be measured under different external conditions, so to account for a variety of operating conditions, but it is not necessary to employ all the data that will be used in the training phase. Indeed, the construction of the training data-base is a progressive operation, so that, at the beginning of the monitoring project, only few instances of the healthy structure may be available. In other words, the set of data used for the filter bank construction should be diverse, but does not need to include all the data that will be used to construct the training model.

In one set of embodiments, the criterion proposed to select the frequency warping scale ($f_1$, $f_2$, $f_3$ or $f_4$), and number of cepstral coefficients, L, is based on the concept that the number of non-zero singular values of a matrix gives the dimension of the principal component of the matrix itself. If the matrix subjected to singular value decomposition is the covariance matrix of the training features, then the number of non-zero singular values is an indication of the dimension the features should have in order to be uncorrelated. It may be then conjectured that if the minimum of the singular values of the features covariance matrix is zero or very small, the dimension of the feature vector could be reduced without losing any accuracy. Consequently, comparing the minima of the singular values of features covariance matrices obtained using different number L of cepstral coefficients should indicate how many coefficients to use to have minimally correlated features.

In these embodiments, the parameter selection criterion starts from the extraction of the cepstral coefficients of the training data for a given pair of frequency scale and number of cepstral coefficients values, henceforward referred to as {L, F}. Then, the sample covariance matrix of the feature population is estimated and subjected to singular value decomposition to obtain the minimum of such values. The procedure is repeated for as many {L, F} pairs as desired. The minima are then compared and the {L, F} combination associated with the minimum singular value exceeded by a predetermined amount of instances is selected as the pair to be used for the damage detection. In an example embodiment, the selected {L, F} pair is the one associated with the singular value minimum exceeded by 85% of the instances.

In a simulation of a structure with 10 degrees of freedom, this criterion selected L=6 cepstral coefficients and frequency scale $f_1$. It is interesting to observe that the selected pair of parameters produces a high accuracy value, at 100%. Other combinations would have produced the same accuracy, implying that there is not a unique combination able to deliver optimum results. Indeed, the proposed criterion seeks to offer a means for delivering an educated guess as for which values to assign to parameters that otherwise would have to be picked randomly.

In a different illustrated embodiment, some frequency bands are selected to correspond to parts of the response spectrum where sharp peaks appear, since those peaks contain important information regarding the energy content of the signal. Since the procedure for the proposed feature extraction in structural response signals will depart from the standard values used in speaker recognition, it will also be desirable to pose a criterion to select the number of coefficients, L, as well. Here, it is proposed that such criterion be based on the principle of PCA, exploiting the properties of DCT.

At this point, the analysis of the spectrum of the reference structural response is used only to identify the area of the spectrum with the greatest energy content, and this can also be pursued by analyzing a reduced number of response instances. If l is the number of frames obtainable from one time history, at the end of this first stage n·s·l response windowed segments are available. Averaging the spectra of all such segments results in the generation of what is referenced hereinafter as an average spectrum. The average spectrum highlights the frequency range within which the greatest energy content is observable.

The user is called to define an upper frequency boundary for the range of maximum energy concentration—a boundary that is called the cutoff frequency, and denoted fc. The objective of this procedure is that of emphasizing the parts of the spectrum that are more likely to be expressing the structural behavior. In this work, it is suggested that the centers of the M triangular filters be equally spaced on the transformed frequency scale, $f_T$, given by Equation 6.

$$f_T = f_c \log_2\left(1 + \frac{f}{f_c}\right) \quad (7)$$

The only input the user is requested to provide is the cutoff frequency $f_c$. Nonetheless, this choice should be quite natural and can be made automatic, as the averaging process and the use of all available sensors clearly highlight the spectrum regions of maximum energy content.

Figure 5A:
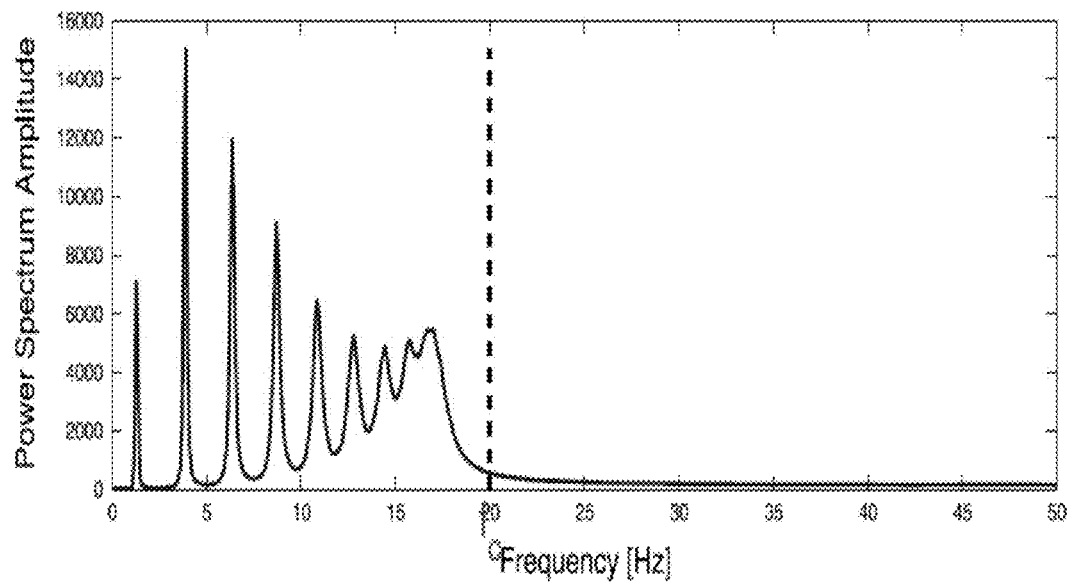
FIG. 5A is a graph that illustrates an example selection of a cutoff frequency for adjusting cepstral coefficients for vibration data, according to an embodiment.
Figure 5B:
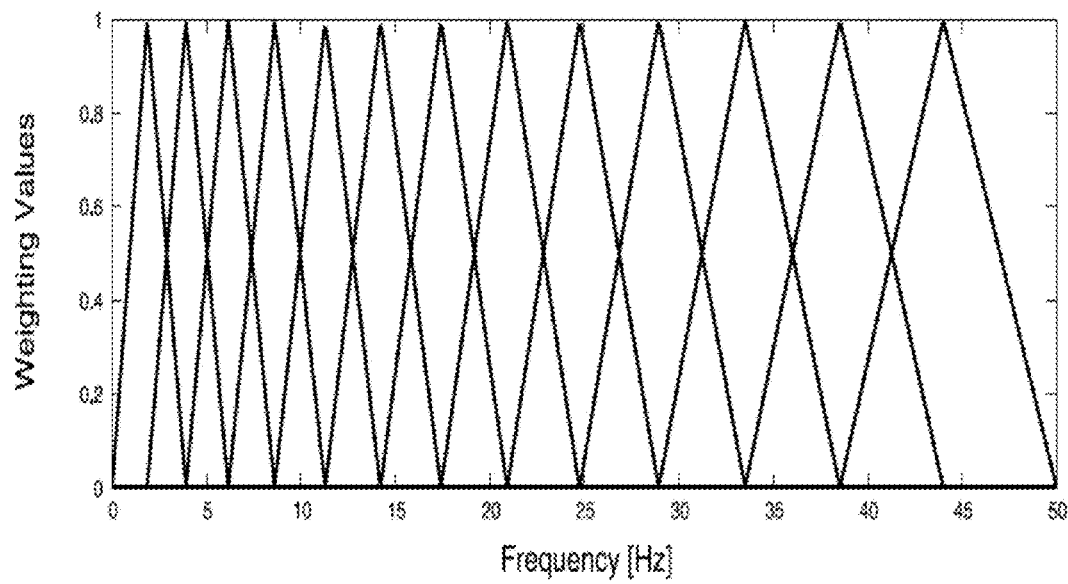
FIG. 5B is a graph that illustrates example triangular filters spaced equally in an example warped frequency scale based on cutoff frequency for vibration data, according to an embodiment.

FIG. 5A is a graph that illustrates an example selection of a cutoff frequency for adjusting cepstral coefficients for vibration data, according to an embodiment. The horizontal axis is linear frequency in Hertz; and the vertical axis indicates power spectrum amplitude in arbitrary units. The trace is a simulated spectrum using simulated data from a 10 degrees of freedom (DOF) shear-type system excited at all DOFs by white Gaussian noise input. To obtain the average spectrum, the acceleration response measured under an undamaged baseline is considered. The number of bands, M, is set up according to the guidelines of Fraile et al. (2008), expressed above in Equation 6, in which fs is equal to 100 Hz. FIG. 5A shows the location of the cutoff frequency $f_c$, indicated by a vertical dashed line, which for this case is 20 Hz. By setting a cutoff frequency at the boundary of the greatest energy content of the spectrum, and forcing the filters to be linearly spaced within this range, the part of spectrum most representative of the structural response is more heavily weighted than the remaining part of the spectrum; thus, emphasizing the characteristics of the structure. FIG. 5B is a graph that illustrates example triangular filters spaced equally in an example warped frequency scale based on cutoff frequency for vibration data, according to an embodiment. The horizontal axis indicates linear frequency in Hz, spanning the sub-acoustic vibrational frequency range; and, the vertical axis indicates filter amplitude relative to the peak value, dimensionless.

Figure 6A:
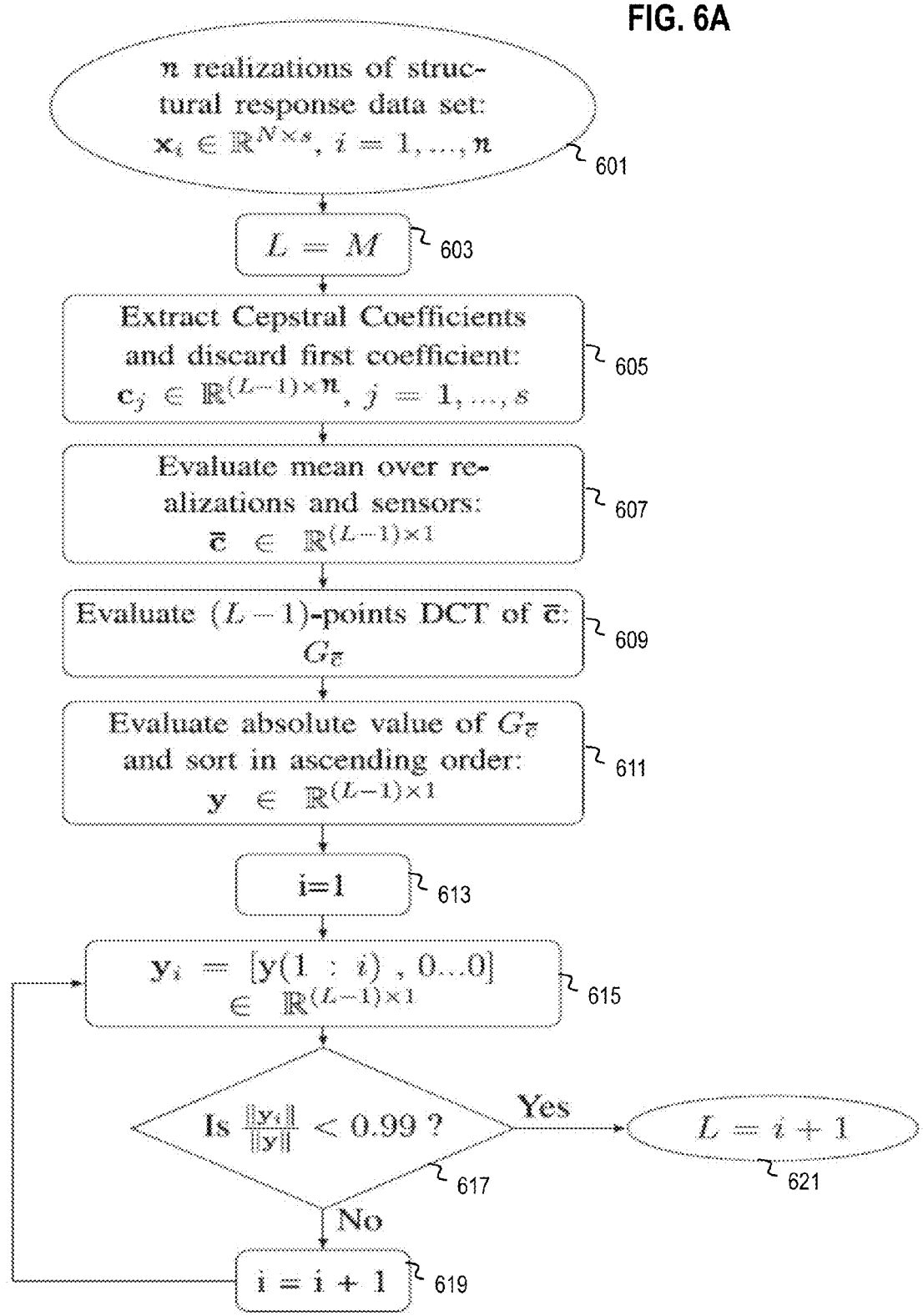
FIG. 6A is a flow diagram that illustrates an example method for determining a number L of cepstral coefficients to use in a damage sensitive feature, according to an embodiment.

As already discussed, another important step in the feature extraction procedure is to select the proper number of coefficients, L, that are advantageously extracted. In this different embodiment, a different approach is used than is described above. For an unsupervised approach, as done for the construction of the filter bank frequency warp, it is advantageous to exploit solely information contained in the training data. FIG. 6A is a flow diagram that illustrates an example method for determining a number L of cepstral coefficients to use in a damage sensitive feature, according to an embodiment. It is assumed that n realizations of the response time histories measured at s different locations, in multiple healthy (undamaged) conditions, are available. Such realizations will normally be the same realizations used to construct the average spectrum used above toe set the cutoff frequency fc. These time histories are obtained in step 601.

In step 603, number of coefficients, L, is initialized to the number of bands, M. In step 605 the Cepstral coefficients are extracted from such time histories. Such extraction procedure is performed following the algorithm shown in FIG. 4A, but using the triangular filters constructed based on the cutoff frequency fc using Equation 7 and depicted in FIG. 5A and FIG. 5B. From each time history, a frequency warped cepstral feature vector $c \in R^{L \times 1}$ is obtained by averaging the l frame frequency warped cepstral vectors, where l again refers to the number of frames in which each time history is segmented. During step 605, the first coefficient from each frequency warped cepstral feature vector is discarded, as in the standard processing.

At the end of step 605, s·n realizations of time warped cepstral feature vectors are available. In step 607, the time warped cepstral feature vectors are ensemble averaged to form a single vector $\bar{c} \in R^{(L-1) \times 1}$.

To determine the final value of L, the number of elements of $\bar{c}$ covering 99 percent of the sequence energy is estimated in steps 609 through 621, according to the method proposed in Jain (1989). In step 609, $G\bar{c}$, the (L−1) point DCT of $\bar{c}$ is evaluated. In step 611, the absolute values of the components of $G\bar{c}$ are evaluated, and the resulting values sorted in ascending order to form a vector, $y \in R^{(L-1) \times 1}$. The Euclidean norm of that vector $\|y\|$ is also computed instep 611. The ratio between the Euclidean norm $\|y_i\|$ of a vector $y_i$, which is a vector of zeros with the first i elements replaced by the first i elements of y, and the Euclidean norm $\|y\|$ of the vector y is iteratively computed in step 615 in a loop formed by steps 613, 615 and 619. In step 613 i is initialized to 1. In step 615, the norm $\|y_i\|$ is computed. In step 617, the ratio $\|y_i\|/\|y\|$ s computed and compared to a target energy fraction. In the illustrated example the target energy fraction is 0.99, but in other embodiments, other values are used. It is anticipated that any fraction greater than about 0.9 gives a satisfactory result. In step 619, the value of i is incremented. The loop continues until the ratio of the two norms exceeds the target energy fraction of 0.99, or until i becomes equal to M−1. In step 621, the last value assumed by i, increased by one unit, is selected as the new value for L.

Figure 6B:
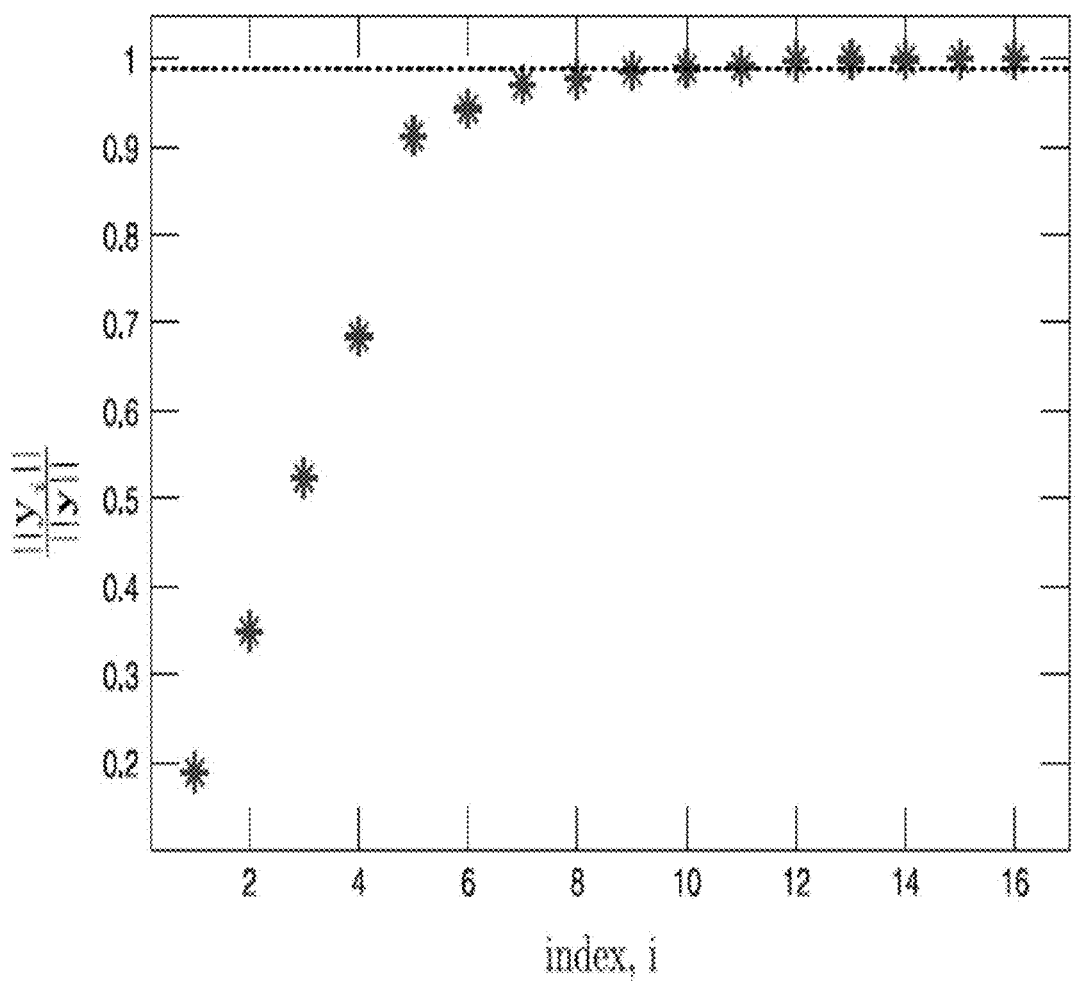
FIG. 6B is a graph that illustrates example dependence of energy in a sequence of cepstral coefficients compared to total energy for determining the number L, according to an embodiment.

FIG. 6B is a graph that illustrates example dependence of energy in a sequence of cepstral coefficients compared to total energy for determining the number L, according to an embodiment. The horizontal axis indicates the index i that indicates the number of magnitude ordered cepstral coefficients retained; and is dimensionless, The vertical axis indicates $\|y_i\|/\|y\|$, the fraction of the total energy in the sequences accounted for by the first i coefficients; and, is also dimensionless. FIG. 6B is a graphical representation of the final step involved in the selection of L. To obtain such a graph, 40 realizations were used of an acceleration response measured at the mid-span of each floor of a base-excited three story steel frame used in an experimental setup described below with reference to FIG. 9A and FIG. 9B. The ratio $\|y_i\|/\|y\|$ becomes greater than 0.99 for i equal to 11, and so the number of cepstral coefficients selected is finally set to 12. In this work a threshold of 99% is used, but other experiments conducted demonstrated that any value in the range of about 90% to about 100% would not affect the results substantially. Thus, the proposed value of 99% can be used without further time consuming parametric analysis.

The operations in this illustrated embodiment for the definition of the filters bank and of the number of cepstral coefficients are run only once at the beginning of the training phase. For both operations, efficient algorithms may be set, reducing the computational requirements to minimum levels. Indeed, the computational requirement for the extraction of cepstral coefficients is lower than that needed for computing autoregression (AR) coefficients. The only parameter the user is asked to select, in this embodiment, is the cutoff frequency $f_c$, but the decision is dramatically facilitated by the analysis of the average spectrum. The choice of discarding higher order cepstral coefficients would not introduce a substantial loss of important information, if the technique proposed in this study is employed, as the number of coefficients is selected to preserve 90% or more of the energy content of the signal. Additionally, the use of DCT assures that the last coefficients are indeed the least useful for recognition purposes, as they can be assimilated to the last components obtained by PCA of the warped log-spectra.

Having determined the damage sensitive feature for this embodiments, which is the most significant time warped cepstral coefficients, it is now shown how to determine whether damage is indicated by the feature. The common scheme is that of constructing a model of the damage sensitive features representative of the healthy states and then comparing new instances of features extracted from the response of the system under unknown conditions against those representative of the original trained model. The comparison is made to determine whether these new instances are novel, e.g., deviating from the reference model, or are instead new realizations of the healthy (undamaged) system.

The training model is usually represented by a probability density function estimated using the trained features. In the illustrated embodiment, the time-warped cepstral features (and AR coefficients) are assumed to be multi-variate and normally distributed. This assumption is not far from reality, especially when the number of training data is large. In fact, for what concerns cepstral coefficients normality, due to the optimal de-correlation properties of inverse DCT, the cepstral coefficients may be considered to be almost uncorrelated, as far as allowed by the use of noisy data. In addition, since the time-warped cepstral vectors are obtained through the same operations, it is reasonable to assume that they are identically distributed. It is well known that a set of n independent identically distributed (i.i.d.) vectors will approach a normal distribution as the limit of n approaches large values. Proofs that AR-coefficients are normally distributed are well documented. Therefore, estimating the mean vector and the covariance matrix of the ensemble of training feature vectors is enough to characterize the distribution of both types of coefficients.

In an illustrated embodiment, the Squared Mahalanobis Distance (SMD) is used as the damage index. The Mahalanobis distance is used to identify and gauge similarity of an unknown sample set to a known one. It differs from Euclidean distance in that it takes into account the correlations of the data set and is scale-invariant. The squared Mahalanobis distance of a d-dimensional point, x, from a population characterized by mean, $\mu$, and covariance matrix, $\Sigma$, is a scalar given by Equation 8.

$$D^2(x) = (x-\mu)^T \Sigma^{-1} (x-\mu) \quad (8)$$

One advantage of employing SMD is the use of the sample covariance matrix, estimated using samples measured under different external conditions, e.g. temperature, traffic, wind in a bridge structure. This accounts for the feature variability in a healthy structure produced by the effects of such factors. Another advantage is that SMD is the preferred metric in the field of outlier detection, such that a substantial body of work is available on the subject. The knowledge of the damage index distribution is advantageous for defining a threshold that is able to robustly distinguish between undamaged and damaged instances.

The squared Mahalanobis distance of normally distributed instances is asymptotically $\chi^2$-distributed with d degrees of freedom, where d is the dimension of the feature vector. However, the asymptotic convergence is very slow, and defining the threshold based on the $\chi^2$ quantiles may be too conservative in some embodiments, even for large samples. Also, the $\chi^2$-distribution of SMD is true when the true mean and covariance matrix of the feature population are employed. In the illustrated embodiment, the sample estimators of the mean and covariance matrix are used. The distribution of the SMD of a d-variate point x, when x is not involved in the estimation of the sample mean and the sample covariance matrix, follows a scaled F-distribution with degrees of freedom d and n–d, where d is the dimension of x, and n is the number of observations used to construct the sample statistics' estimators. As detailed below, this property is used to set the threshold value in some embodiments.

Figure 7A:
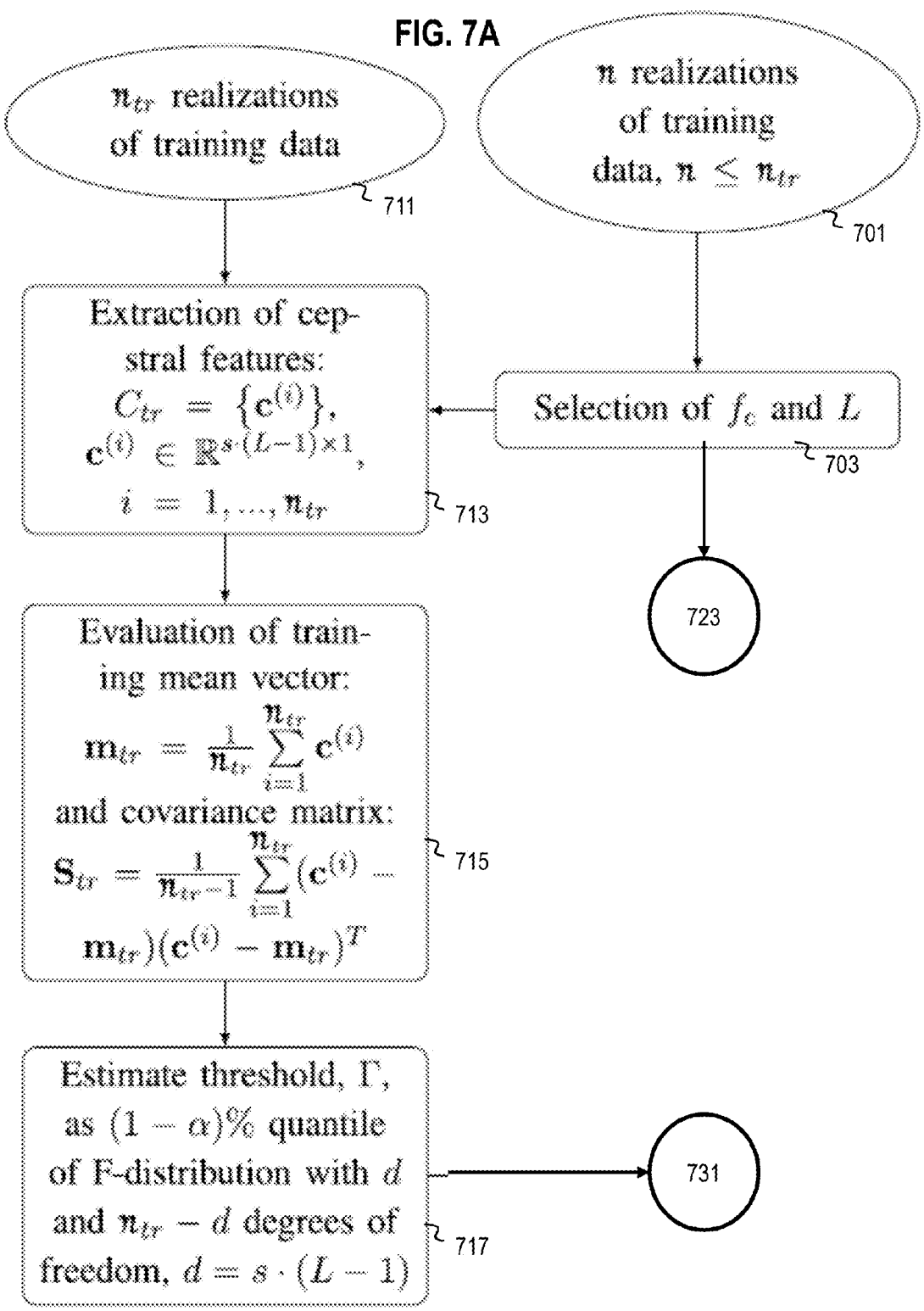
FIG. 7A through FIG. 7C are portions of a flow diagram that illustrates an example method for determining and using a damage threshold for the damage sensitive feature, according to an embodiment.
Figure 7B:
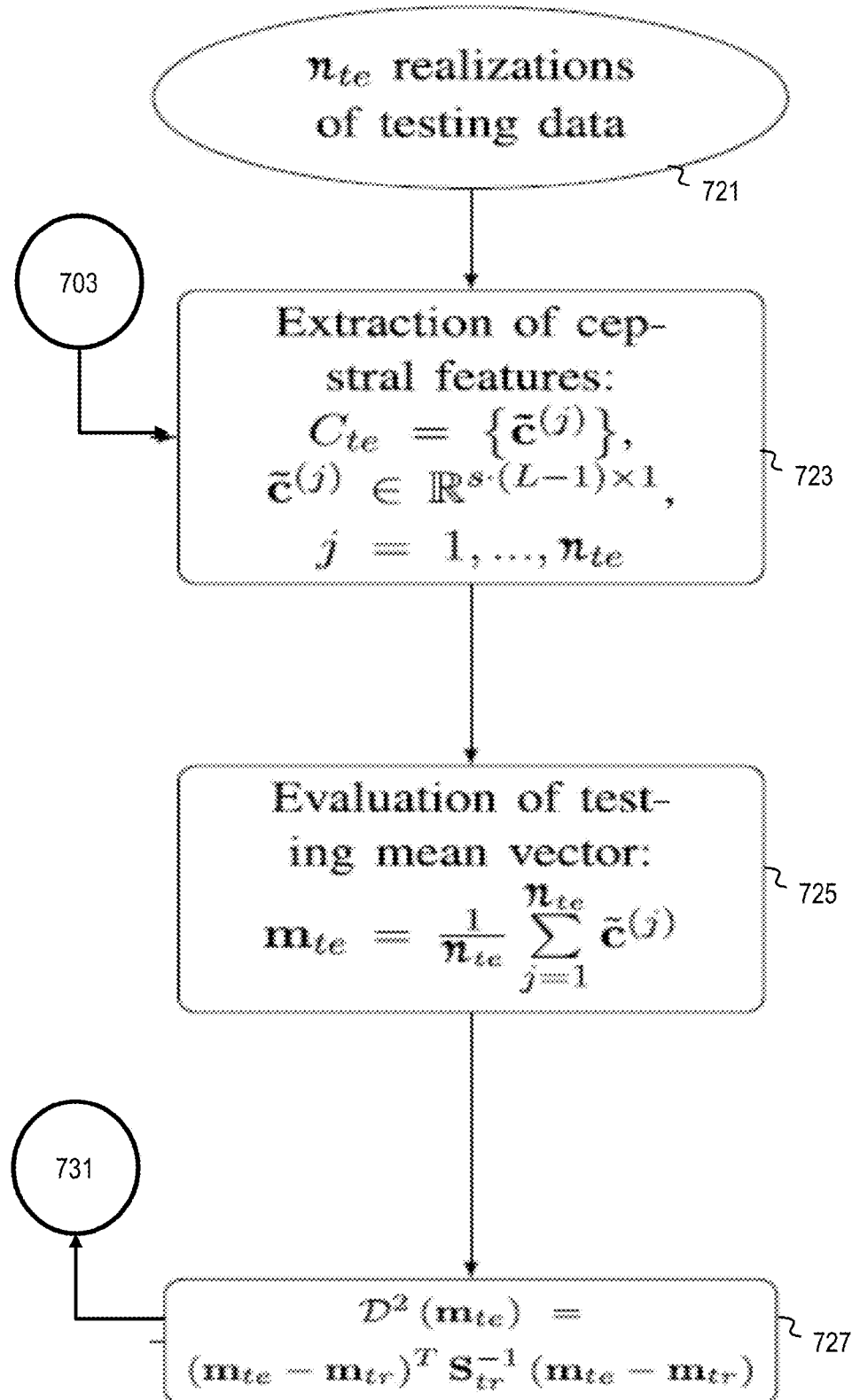
Figure 7C:
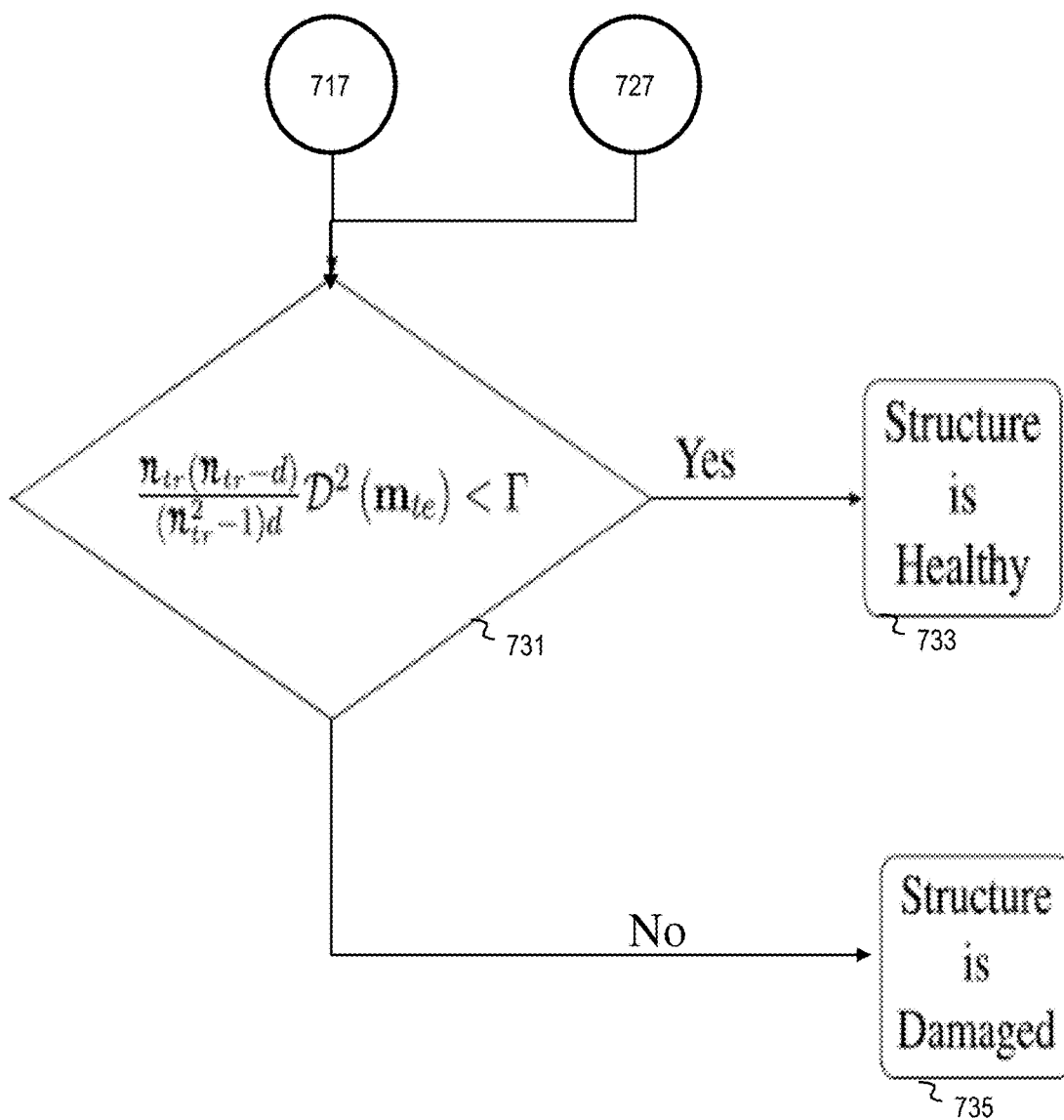

FIG. 7A through FIG. 7C are portions of a flow diagram that illustrates an example method for determining and using a damage threshold for the damage sensitive feature, according to an embodiment. The steps of FIG. 7A are performed during processing of a training set. The steps of FIG. 7B and FIG. 7C are performed with subsequently collected data, called test data, during a testing phase.

In step 701, the training data is obtained. It is assumed that, for the training phase, $n_{tr}$ sets of structural response time histories are available from each of the s sensors located on the monitored system. During step 703, prior to engaging into the feature extraction process, a subset of the $n_{tr}$ realizations, previously referred to as n, is selected to determine cutoff frequency fc and construct the filter bank using transformed frequency $f_T$ from Equation 7. Then, the method of FIG. 6A is run to select the number of cepstral coefficients, L.

At this point, retrieving all the training set data in step 711, the time warped cepstral feature vectors can be extracted from each of the $n_{tr}$·s time histories during step 713. Each response time series of the ith data set realization is divided into l frames, and from each frame a (L–1)×1 feature vector is derived. As previously explained, the first cepstral coefficient is discarded to mitigate input effects.

In step 715, the sample mean of the l feature vectors is stored and concatenated to the other s–1 mean feature vectors, generating a feature vector $c^{(i)} \in R^{s \cdot (L-1) \times 1}$, for i=1, ... $n_{tr}$. The training model is then constituted by the set of $n_{tr}$ feature vectors $c^{(i)}$, for i=1, ... , $n_{tr}$, whose sample mean is given by Equation 9 and unbiased sample covariance matrix is given by equation 10 to form the training model.

$$m_{tr} = \frac{1}{n_{tr}} \sum_{i=1}^{n_{tr}} c^{(i)} \quad (9)$$

$$S_{tr} = \frac{1}{n_{tr}-1} \sum_{i=1}^{n_{tr}} (c^{(i)} - m_{tr})(c^{(i)} - m_{tr})^T \quad (10)$$

It is further assumed that a test set of $n_{te}$ data sets are available for testing. These are data sets for which the condition of the structure is unknown and are used to assess whether or not changes have occurred in the structure. In step 721 of FIG. 7B, the test set is obtained or retrieved. In the case of short-term applications, $n_{te}$ can be equal to 1 but, in general, it is assumed that $n_{te} \geq 1$.

In step 723, from each data set of the test set, a feature vector $\tilde{c}^{(j)} \in R^{s \cdot (L-1) \times 1}$, for j=1, ... , $n_{te}$, is extracted, in order to get a population of $n_{te}$ feature vectors based on the most significant, time warped, cepstral coefficients. In step 725, the mean feature vector in the test set is computed using Equation 11, analogous to Equation 9.

$$m_{te} = \frac{1}{n_{te}} \sum_{j=1}^{n_{te}} \tilde{c}^{(j)} \quad (11)$$

In step 727, the squared Mahalanobis distance between training model and test set is estimated according to Equation 12, analogous to Equation 8.

$$D^2(m_{te}) = (m_{te} - m_{tr})^T S_{tr}^{-1}(m_{te} - m_{tr}) \quad (12)$$

In step 731 of FIG. 7C, the damage index $D^2(m_{te})$ is compared against a threshold, Γ, in order to assess the occurrence of damage. A value for Γ is estimated based on the training set in step 717 of FIG. 7A.

As previously stated, the squared Mahalanobis distance of the testing point $m_{te} \in R^{s \cdot (L-1) \times 1}$ from the training population, whose sample mean vector, $m_{tr}$, and the sample covariance matrix, $S_{tr}$, have been estimated using $n_{tr}$ data points, but without using the point $m_{te}$, is distributed according to a scaled F-distribution with degrees of freedom $s \cdot (L-1)$ and $n_{tr} - s \cdot (L-1)$, as given by Equation 13, $$\frac{n_{tr}(n_{tr} - d)}{(n_{tr}^2 - 1)d} D^2(m_{te}) \sim F_{d, n_{tr} - d} \quad (13)$$

where d is equal to $s \cdot (L-1)$.

The threshold, Γ, is then set to the value of the $(1-\alpha)$-quantile of $F_{d, n_{tr}-d}$, in step 717 of FIG. 7A. In an illustrated embodiment, α is set equal to 1 percent.

For each test, the value of $D^2(m_{te})$, scaled by $n_{tr}(n_{tr}-d)/(n^2_{tr}-1)d$ can then be compared to Γ in step 731, as given in inequality expressed in Equation 14.

$$\frac{n_{tr}(n_{tr} - d)}{(n_{tr}^2 - 1)d} D^2(m_{te}) < \Gamma \quad (14)$$

If it exceeds the threshold value, then the structure is determined to be damaged in step 735. If not, then the structure is determined to be healthy in step 733.

Two case studies are considered, in order to analyze the performance of the proposed damage detection algorithm in the embodiment illustrated in FIG. 7A through FIG. 7C. The first case study exploits the acceleration response time histories simulated from a 10 DOFs shear-type system. In the second case study, the acceleration response time histories recorded on the 3-story scaled building model available at the Engineering Institute of the Los Alamos National Laboratory are used to solve the damage detection problem. The results obtained from this second case are particularly important, as the mechanism employed to model damage on the frame leads the system to behave nonlinearly.

Figure 8:
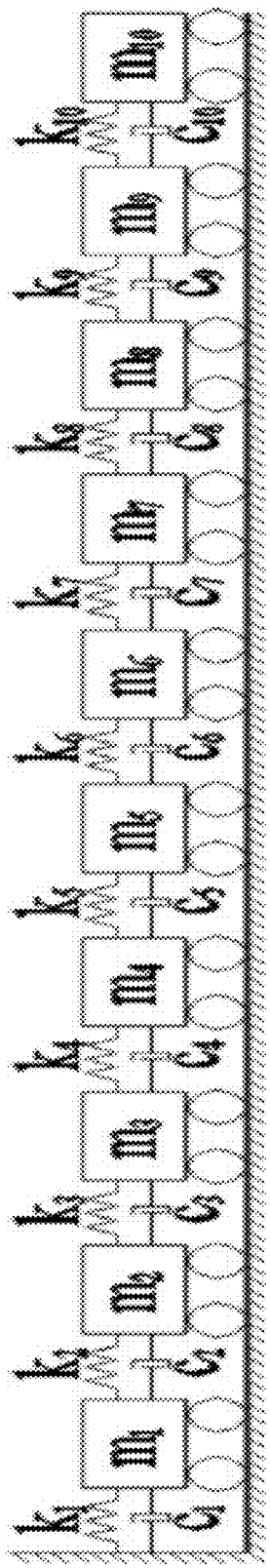
FIG. 8 is a diagram that illustrates an example simulation for testing the method of FIG. 7A through FIG. 7C, according to an embodiment.

FIG. 8 is a diagram that illustrates an example simulation for testing the method of FIG. 7A through FIG. 7C, according to an embodiment. The simulated system tested to demonstrate the proposed method is a 10-story shear-type system, modeled according to the common mass-spring-viscous damper chain. The nodes are numbered in ascending order, so that the node closest to the constraint is labeled as 1. The inter-story stiffness between the (ith−1) node and the ith node is denoted as ki and the damping by Ci. The mass of the ith floor is denoted by mi. The energy dissipation properties of the system were modeled through the Rayleigh damping mechanism.

The performances of the two damage sensitive features (based on frequency warped cepstral coefficients and AR coefficients, respectively) are comparable, although the cepstral coefficients perform slightly better than the AR coefficients when sensors are not located in the immediate proximity of the damage. Of particular interest are the results obtained from a damage state that corresponds to a 10 percent reduction of the stiffness of the first element. When using the third sensor setup, state D4 is the most difficult to be correctly identified for both damage sensitive features. When using cepstral coefficients the majority of the damaged instances are declared damaged. However, only a minimum part of such instances are correctly declared as damaged when the AR coefficients are employed. This suggests that both types of coefficients perform better when there is a sensor in the proximity of the damage. In fact, the third sensor setup does not include any sensor in the proximity of the first degree of freedom. It is also interesting to note that the damage index magnitude is higher for damage cases that are characterized by a 15 percent decrease of inter-story stiffness, while it decreases for cases with 10 percent reduction, indicating proportionality between the amplitude of cepstral features and the damage severity.

Figure 9A:
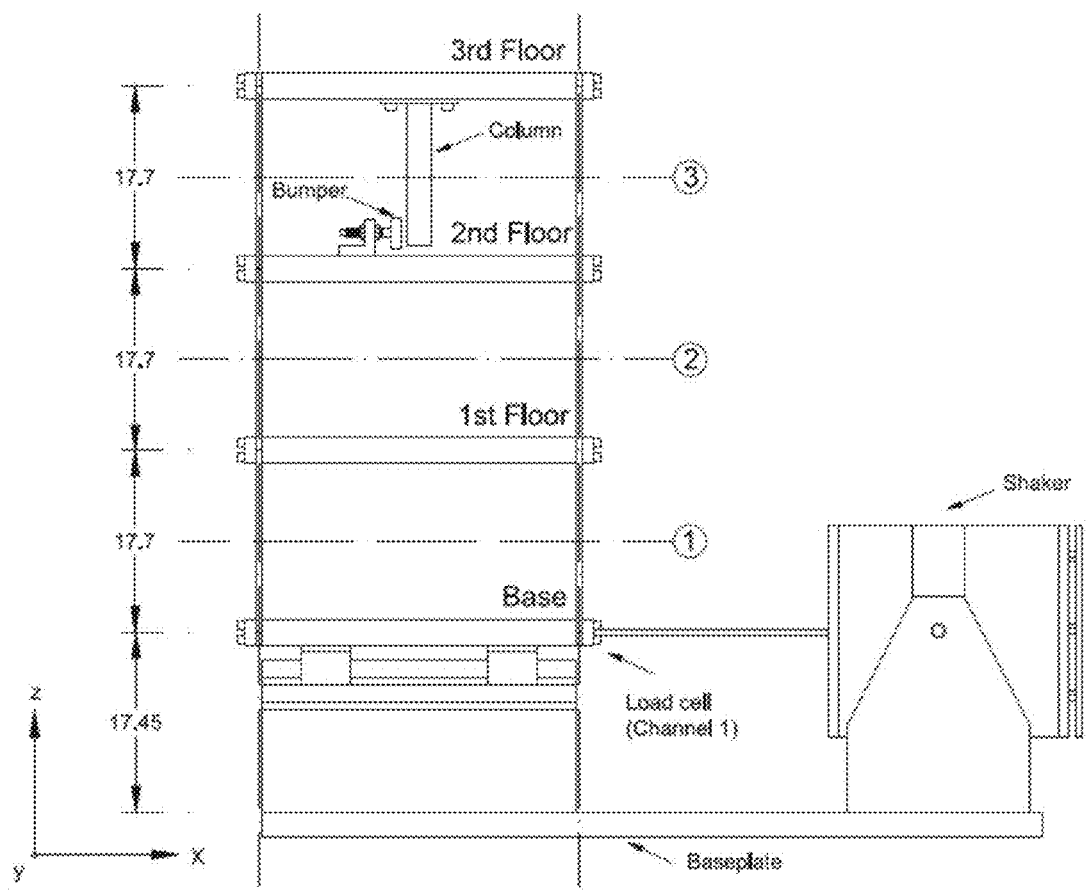
FIG. 9A and FIG. 9B are diagrams that illustrate an experimental setup from which data was used for testing the method of FIG. 7A through FIG. 7C, according to an embodiment.
Figure 9B:
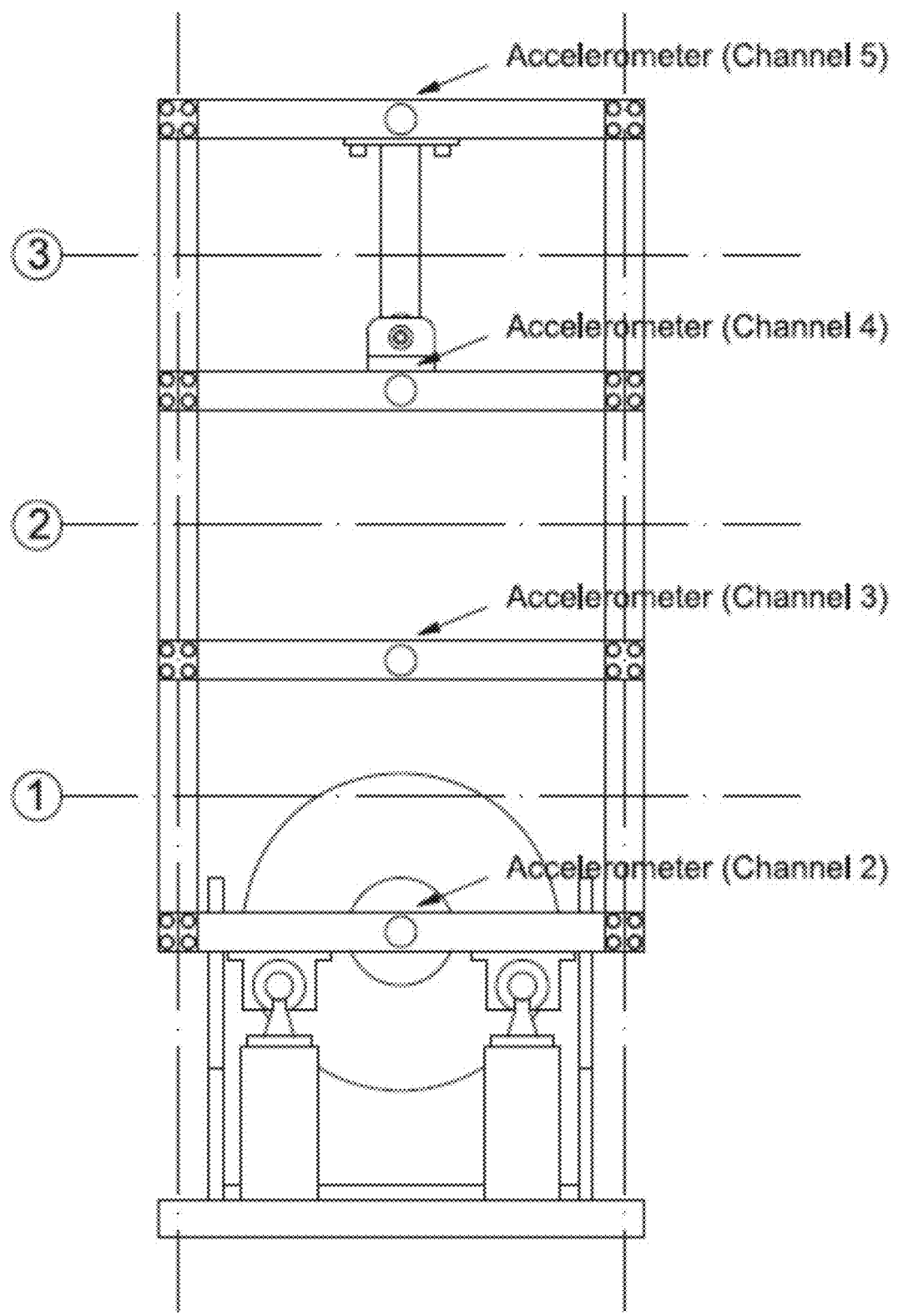

FIG. 9A and FIG. 9B are diagrams that illustrate an experimental setup from which data is used for testing the method of FIG. 7A through FIG. 7C, according to an embodiment. The structure is a laboratory three-story frame whose schematic and sensor locations are shown. Damage is modeled through a mechanism made up of a bumper and a column. The column hangs from the third floor and may hit a bumper, anchored at the second floor, and whose distance from the column's tip is adjustable. The further the bumper from the column's tip, the milder the damage. This kind of mechanism aims to mimic opening/closing crack behavior due to dynamic loads. See, E. Figueiredo, G. P. J. Figueiras, C. R. Farrar and K. Worden (2009). Structural Health Monitoring algorithm comparisons using standard data sets, *Los Alamos National Laboratory Report*, LA-14393; and E. Figueiredo, G. Park, C. R. Farrar, K. Worden and J. Figueiras (2011). Machine learning algorithms of damage detection under operational and environmental variability. *Structural Health Monitoring* 10(6), 559-572.

Load is applied by means of an electrodynamic shaker to the base floor along the center line of the frame. The system is instrumented with four accelerometers mounted at the center line of each floor on the opposite side of the excitation source. Sensors and shaker locations, together with the use of linear bearings on which the frame slides during the excitation, work together to minimize the occurrence of torsional effects in the system. Signals are sampled at 320 Hz for 25.6 s in duration. The input time history is a band-limited excitation in the range of 20-150 Hz applied at the base. The input spectrum band was used to prevent the excitation of the rigid body motions triggered at frequencies lower than 20 Hz. The acceleration response time histories at all floors, including the first floor, and the input excitation are measured.

For identification of the damaged states, it is noteworthy that both kinds of damage sensitive features prove to be particularly sensitive to impact-like damages. The damage index magnitude for a damaged structure is now much higher than that for an undamaged structure, so that the outcomes obtained running the tests on damaged states must be plotted on a scale different from that used to display the results from the undamaged cases. Once again, as observed in the simulated embodiment, the values of the damage indexes increase proportionally to the increase of the damage severity, hence indicating sensitivity to damage severity for the experimental embodiment, as well.

Figure 10:
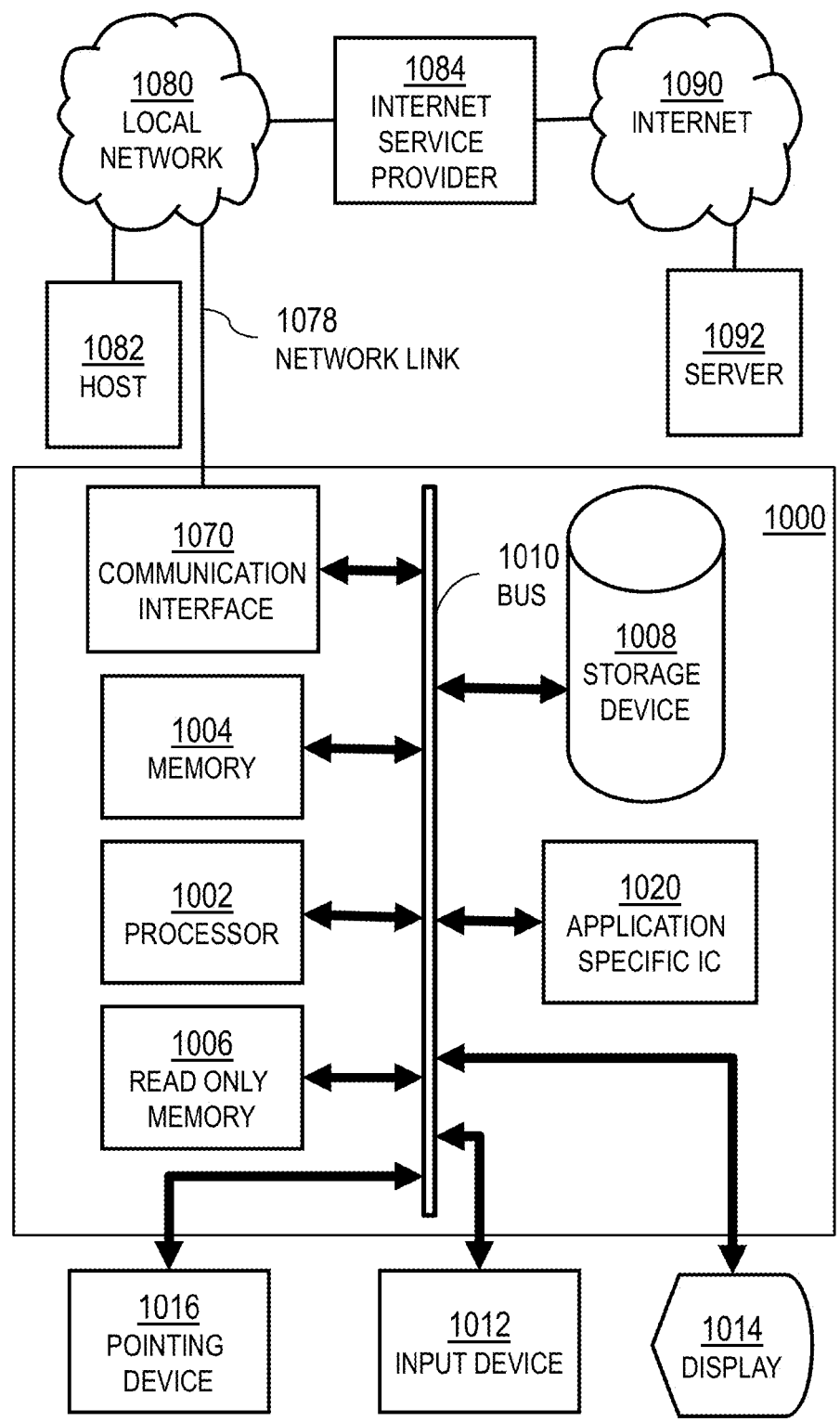
FIG. 10 is a block diagram that illustrates a computer system upon which an embodiment of the invention may be implemented.

Comparing the properties of cepstral features with those of the AR coefficients, the parameters of the illustrated embodiment are generally more compact and require lower computational effort than the AR coefficients, making the model more robust to environmental factors. More importantly, the results show that cepstral coefficients are less sensitive to environmental and operational variability in the training data than AR coefficients. Moreover, the false acceptance rate of cepstral coefficients is quite low, never exceeding 5 percent, for the embodiments considered. The use of experimental data measured on a system where damage is not modeled through the conventional stiffness reduction approach suggests that the proposed procedure is well suited for real-life applications Hardware Overview FIG. 10 is a block diagram that illustrates a computer system 1000 upon which an embodiment of the invention may be implemented. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of one or more methods described herein.

A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitutes computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk or optical disk, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), for presenting images, and a pointing device 1016, such as a mouse or a trackball or cursor direction keys, for controlling a position of a small cursor image presented on the display 1014 and issuing commands associated with graphical elements presented on the display 1014.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1070 sends and receives electrical, acoustic or electromagnetic signals, including infrared and optical signals, that carry information streams, such as digital data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1002, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1002, except for carrier waves and other signals.

Logic encoded in one or more tangible media includes one or both of processor instructions on a computer-readable storage media and special purpose hardware, such as ASIC 1020.

Network link 1078 typically provides information communication through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides information representing video data for presentation at display 1014.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020, may be used in place of or in combination with software to implement the invention. Thus, embodiments of the invention are not limited to any specific combination of hardware and software.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1002 as it is received, or may be stored in storage device 1008 or other non-volatile storage for later execution, or both. In this manner, computer system 1000 may obtain application program code in the form of a signal on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
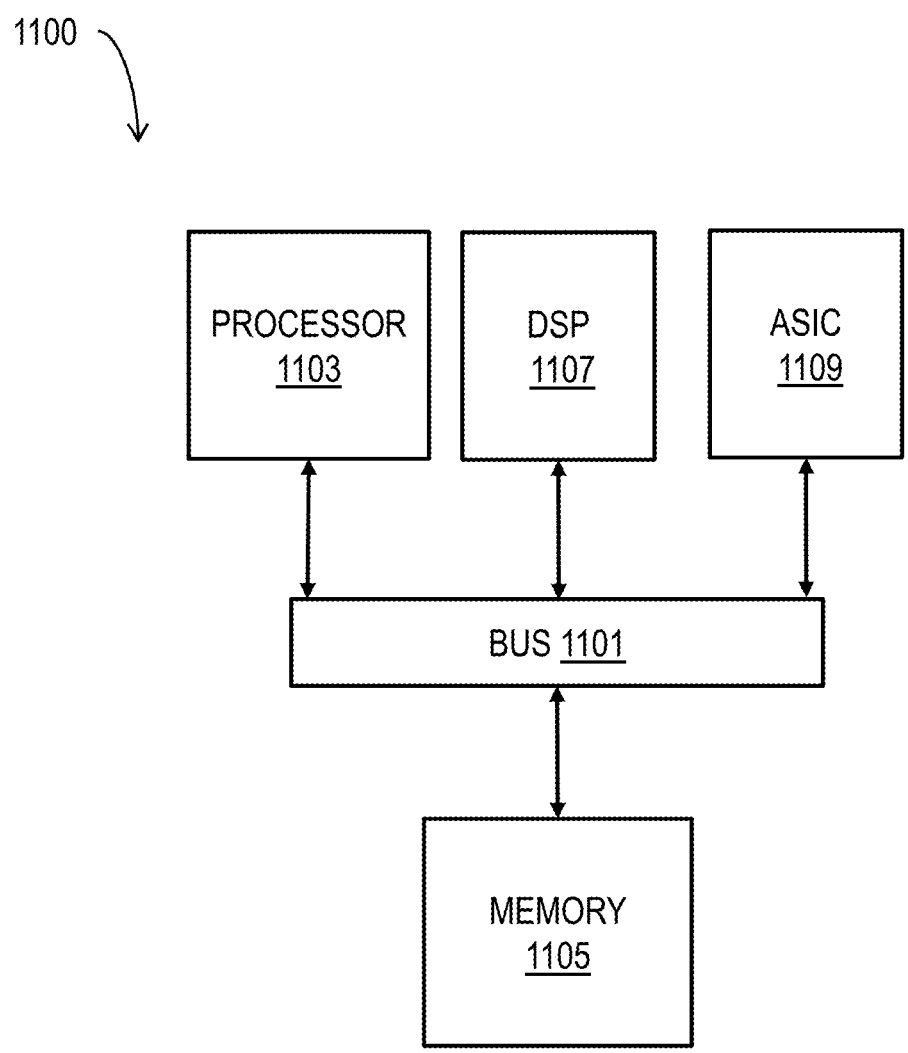
FIG. 11 illustrates a chip set upon which an embodiment of the invention may be implemented.

FIG. 11 illustrates a chip set 1100 upon which an embodiment of the invention may be implemented. Chip set 1100 is programmed to perform one or more steps of a method described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of a method described herein.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1105 also stores the data associated with or generated by the execution of one or more steps of the methods described herein.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items. elements or steps. Furthermore, the indefinite article "a" or "an" is meant to indicate one or more of the item, element or step modified by the article.

What is claimed is:

1. A method comprising:
   determining a system-independent statistical model;
   determining a healthy system model based on data representing vibrations of multiple healthy dynamic systems and the system-independent statistical model and speaker recognition techniques;
   obtaining vibration data from a particular dynamic system; and
   determining whether the particular dynamic system is healthy based on the vibration data from the particular dynamic system and the system-independent statistical model and the healthy system model and speaker recognition techniques.

2. A method as recited in claim 1, wherein:
   determining the system-independent statistical model comprises further determining the system-independent statistical model based on a speaker-independent statistical model of human voices; and
   determining the healthy system model further comprises determining the healthy system model based on data representing vibrations of multiple healthy dynamic systems transformed in frequency to a frequency band of human voices.

3. A method as recited in claim 2, wherein determining whether the particular dynamic system is healthy further comprises determining whether the particular dynamic system is healthy based on the vibration data from the particular dynamic system transformed in frequency to a frequency band of human voices.

4. A method as recited in claim 1, wherein the dynamic system is an architectural structure.

5. A method as recited in claim 1, wherein the dynamic system is vibrating machinery.

6. An apparatus comprising:
   at least one processor; and
   at least one memory including one or more sequences of instructions,
   the at least one memory and the one or more sequences of instructions configured to, with the at least one processor, cause the apparatus to perform at least the following,
   determine a system-independent statistical model;
   determine an healthy system model based on data representing vibrations of multiple healthy dynamic systems and the system-independent statistical model and speaker recognition techniques;
   obtain vibration data from a particular dynamic system; and
   determine whether the particular dynamic system is healthy based on the vibration data from the particular dynamic system and the system-independent statistical model and the healthy system model and speaker recognition techniques.

7. A non-transitory computer-readable medium carrying one or more sequences of instructions, wherein execution of the one or more sequences of instructions by one or more processors causes an apparatus to perform the steps of:
   determining a system-independent statistical model;
   determining an healthy system model based on data representing vibrations of multiple healthy dynamic systems and the system-independent statistical model and speaker recognition techniques;
   obtaining vibration data from a particular dynamic system; and
   determining whether the particular dynamic system is healthy based on the vibration data from the particular dynamic system and the system-independent statistical model and the healthy system model and speaker recognition techniques.

8. A method comprising:
   obtaining training data that represents vibrations of a healthy dynamic system under a plurality of conditions;
   determining a damage sensitive parameter based on the training data by warping a frequency scale of the training data;
   determining a threshold value that separates damaged dynamic systems from healthy dynamic systems based on the training data and the damage sensitive parameter;
   obtaining vibration data from a particular dynamic system; and
   determining whether a particular dynamic system is healthy based on the threshold value and a value for the damage sensitive parameter for the vibration data from the particular dynamic system.

9. A method as recited in claim 8, wherein determining the damage sensitive parameter further comprises:
   warping the frequency scale according to each of a plurality of warping functions;
   for each warping function determine a minimum non-zero singular value for each covariance matrix based on a corresponding one of a plurality of number of cepstral coefficients;
   selecting as the damage sensitive parameter a particular number of cepstral coefficients for a particular warping function that together yield a minimum singular value exceeded by the minimum singular value of most of the other combinations of warping functions and number of cepstral coefficients.

10. A method as recited in claim 9, wherein most of the other combinations of warping functions and number of cepstral coefficients is about 85% of the other combinations of warping functions and number of cepstral coefficients.

11. A method as recited in claim 8, wherein determining the threshold value further comprises:
- determining for each condition of the plurality of conditions in the training data, a distance between a value of the damage sensitive parameter for that condition to a mean value of the damage sensitive parameter for all other conditions of the plurality of conditions in the training data; and
- selecting the threshold value that is exceeded by a small percentage of the plurality of conditions in the training set.

12. A method as recited in claim 11, wherein the distance between the value of the damage sensitive parameter for that condition to the mean value is a squared Mahalanobis distance.

13. A method as recited in claim 11, wherein the small percentage of the plurality of conditions in the training set is in a range from about 1% to about 5%.

14. A method as recited in claim 8, wherein the dynamic system is an architectural structure.

15. A method as recited in claim 8, wherein the dynamic system is vibrating machinery.

16. A method as recited in claim 8, wherein determining the damage sensitive parameter further comprises:
- warping the frequency f by applying a plurality of triangular filters centered at a corresponding plurality of increments of a transformed frequency $f_T$, wherein $f_T = fc \log_2(1+f/fc)$, and
  - fc is a cutoff frequency selected just above a highest frequency peak in a power spectrum from the training set; and
- determining the damage sensitive parameter as a number L of cepstral coefficients for the spectrum on the transformed frequency scale.

17. A method as recited in claim 16, wherein determining the damage sensitive parameter further comprises determining the number L of cepstral coefficients that accounts for more than about 90% of energy in the power spectrum from the training set.

18. A method as recited in claim 8, wherein the healthy dynamic system comprises a plurality of healthy dynamic systems.

19. A system comprising:
- at least one processor; and
- at least one memory including one or more sequences of instructions,
- the at least one memory and the one or more sequences of instructions configured to, with the at least one processor, cause an apparatus to perform at least the following,
  - obtaining training data that represents vibrations of a healthy dynamic system under a plurality of conditions;
  - determining a damage sensitive parameter based on the training data by warping a frequency scale of the training data;
  - determining a threshold value that separates damaged dynamic systems from healthy dynamic systems based on the training data and the damage sensitive parameter;
  - obtaining vibration data from a particular dynamic system; and
  - determining whether the particular dynamic system is healthy based on the threshold value and a value for the damage sensitive parameter for the vibration data from the particular dynamic system.

20. A non-transitory computer-readable medium carrying one or more sequences of instructions, wherein execution of the one or more sequences of instructions by one or more processors causes an apparatus to perform the steps of:
- obtaining training data that represents vibrations of a healthy dynamic system under a plurality of conditions;
- determining a damage sensitive parameter based on the training data by warping a frequency scale of the training data;
- determining a threshold value that separates damaged dynamic systems from healthy dynamic systems based on the training data and the damage sensitive parameter;
- obtaining vibration data from a particular dynamic system; and
- determining whether the particular dynamic system is healthy based on the threshold value and a value for the damage sensitive parameter for the vibration data from the particular dynamic system.

* * * * *